(12) United States Patent
Kume et al.

(10) Patent No.: US 12,258,031 B2
(45) Date of Patent: Mar. 25, 2025

(54) PRESENTATION CONTROL DEVICE AND AUTOMATED DRIVING CONTROL SYSTEM

(71) Applicant: DENSO CORPORATION, Kariya (JP)

(72) Inventors: Takuya Kume, Kariya (JP); Yukari Itou, Kariya (JP); Kazuki Kojima, Kariya (JP); Shiori Maneyama, Kariya (JP)

(73) Assignee: DENSO CORPORATION, Kariya (JP)

( * ) Notice: Subject to any disclaimer, the term of this patent is extended or adjusted under 35 U.S.C. 154(b) by 188 days.

(21) Appl. No.: 17/954,665

(22) Filed: Sep. 28, 2022

(65) Prior Publication Data

US 2023/0020471 A1  Jan. 19, 2023

Related U.S. Application Data

(63) Continuation of application No. PCT/JP2021/009322, filed on Mar. 9, 2021.

(30) Foreign Application Priority Data

Mar. 31, 2020 (JP) .................................. 2020-062633
Feb. 17, 2021 (JP) .................................. 2021-023680

(51) Int. Cl.
*B60W 50/14* (2020.01)
*B60W 60/00* (2020.01)

(52) U.S. Cl.
CPC .......... *B60W 50/14* (2013.01); *B60W 60/005* (2020.02)

(58) Field of Classification Search
CPC .. B60K 2360/175; B60K 35/00; B60K 35/23; B60K 35/28; B60W 2050/143;
(Continued)

(56) References Cited

U.S. PATENT DOCUMENTS 9,463,793 B2 * 10/2016 Lind ...................... B60W 30/17
2014/0025259 A1 * 1/2014 Szwabowski ......... B60W 50/00
701/36

(Continued)

FOREIGN PATENT DOCUMENTS

JP          2005324661 A       11/2005
JP          2017107502 A       6/2017
(Continued)

*Primary Examiner* — Tyler J Lee

(74) *Attorney, Agent, or Firm* — Harness, Dickey & Pierce, P.L.C.

(57) ABSTRACT

A presentation control device is configured to control information presentation to a driver of a vehicle. A determination unit is configured to distinguish between a monitoring interruption mode in which the driver is permitted to interrupt surroundings monitoring and a monitoring-required mode in which the driver is prohibited to interrupt the surroundings monitoring, and in the monitoring-required mode, between a hands-free permitted state and a hands-free prohibited state. A presentation control unit configured to perform the information presentation related to a mode transition from the monitoring interruption mode to the monitoring-required mode when the mode transition occurs. The presentation control unit is configured to perform the information presentation at an earlier timing when the monitoring interruption mode is transitioned to the hands-free prohibited state than when the monitoring interruption mode is transitioned to the hands-free permitted state.

13 Claims, 14 Drawing Sheets

(58) Field of Classification Search
CPC ..... B60W 2050/146; B60W 2540/229; B60W 50/14; B60W 60/005; B60W 60/0053; G08G 1/16

See application file for complete search history.

(56) References Cited

U.S. PATENT DOCUMENTS

| | | | |
|---|---|---|---|
| 2017/0315556 A1 | 11/2017 | Mimura et al. | |
| 2018/0046185 A1 | 2/2018 | Sato et al. | |
| 2019/0025823 A1* | 1/2019 | Christiansen | B60K 35/60 |
| 2019/0039618 A1 | 2/2019 | Mori | |
| 2019/0286127 A1 | 9/2019 | Watanabe et al. | |
| 2020/0017124 A1* | 1/2020 | Camhi | B60W 60/0053 |
| 2020/0139992 A1* | 5/2020 | Oba | G08G 1/16 |
| 2020/0391790 A1* | 12/2020 | Kamemura | B62D 5/006 |
| 2021/0024097 A1* | 1/2021 | Jardine | B60W 60/001 |
| 2021/0229706 A1* | 7/2021 | Jones | B60W 60/0057 |
| 2023/0347926 A1* | 11/2023 | Hayakawa | G08G 1/052 |

FOREIGN PATENT DOCUMENTS

| | | |
|---|---|---|
| JP | 2017200786 A | 11/2017 |
| JP | 2018027726 A | 2/2018 |
| JP | 2019043176 A | 3/2019 |
| JP | 2019156232 A | 9/2019 |
| WO | WO-2017154396 A1 | 9/2017 |

* cited by examiner

PRESENTATION CONTROL DEVICE AND AUTOMATED DRIVING CONTROL SYSTEM

CROSS REFERENCE TO RELATED APPLICATION

The present application is a continuation application of International Patent Application No. PCT/JP2021/009322 filed on Mar. 9, 2021, which designated the U.S. and claims the benefit of priority from Japanese Patent Application No. 2020-062633 filed on Mar. 31, 2020, and Japanese Patent Application No. 2021-023680 filed on Feb. 17, 2021. The entire disclosures of all of the above applications are incorporated herein by reference.

TECHNICAL FIELD

The present disclosure in the present specification relates to a technique for presenting information to a driver of a vehicle capable of performing automated driving and a technique for controlling driving of a vehicle capable of performing automated driving.

BACKGROUND

A device that gives a warning according to a state of a driver when it is determined that it is not possible to continue automated driving is known. This device uses a plurality of output devices to give a warning when a driver is performing a second task.

SUMMARY

A first aspect of the present disclosure is a presentation control device configured to control information presentation to a driver of a vehicle capable of performing automated driving. The presentation control device includes a determination unit configured to distinguish between a monitoring interruption mode in which the driver is permitted to interrupt surroundings monitoring and a monitoring-required mode in which the driver is prohibited to interrupt the surroundings monitoring, and in the monitoring-required mode, between a hands-free permitted state in which the driver is permitted to release hands from a steering wheel and a hands-free prohibited state in which the driver is prohibited to release the hands from the steering wheel; and a presentation control unit configured to perform the information presentation related to a mode transition from the monitoring interruption mode to the monitoring-required mode when the mode transition occurs. The presentation control unit is configured to perform the information presentation at an earlier timing when the monitoring interruption mode is transitioned to the hands-free prohibited state of the monitoring-required mode than when the monitoring interruption mode is transitioned to the hands-free permitted state of the monitoring-required mode.

A second aspect of the present disclosure is a computer program product configured to control information presentation to a driver of a vehicle capable of performing automated driving. The computer program product is stored on at least one of a non-transitory computer readable medium and includes instructions configured to, when executed by at least one processor, cause the at least one processor to: distinguish between a monitoring interruption mode in which the driver is permitted to interrupt surroundings monitoring and a monitoring-required mode in which the driver is prohibited to interrupt the surroundings monitoring, and in the monitoring-required mode, between a hands-free permitted state in which the driver is permitted to release hands from a steering wheel and a hands-free prohibited state in which the driver is prohibited to release the hands from the steering wheel; perform the information presentation related to a mode transition from the monitoring interruption mode to the monitoring-required mode when the mode transition occurs; and perform the information presentation at an earlier timing when the monitoring interruption mode is transitioned to the hands-free prohibited state of the monitoring-required mode than when the monitoring interruption mode is transitioned to the hands-free permitted state of the monitoring-required mode.

A third aspect of the present disclosure is an automated driving control system configured to control automated driving of a vehicle. The automated driving control system includes: a determination unit configured to distinguish between a monitoring interruption mode in which the driver is permitted to interrupt surroundings monitoring and a monitoring-required mode in which the driver is prohibited to interrupt the surroundings monitoring, and in the monitoring-required mode, between a hands-free permitted state in which the driver is permitted to release hands from a steering wheel and a hands-free prohibited state in which the driver is prohibited to release the hands from the steering wheel; a presentation control unit configured to perform the information presentation related to a mode transition from the monitoring interruption mode to the monitoring-required mode when the mode transition occurs; and a speed control unit configured to configured to control a traveling speed of the vehicle to be lower when the monitoring interruption mode is transitioned to the hands-free prohibited state of the monitoring-required mode than when the monitoring interruption mode is transitioned to the hands-free permitted state of the monitoring-required mode.

A fourth aspect of the present disclosure is a computer program product configured to control automated driving of a vehicle. The computer program product is stored on at least one of a non-transitory computer readable medium and includes instructions configured to, when executed by at least one processor, cause the at least one processor to: distinguish between a monitoring interruption mode in which the driver is permitted to interrupt surroundings monitoring and a monitoring-required mode in which the driver is prohibited to interrupt the surroundings monitoring, and in the monitoring-required mode, between a hands-free permitted state in which the driver is permitted to release hands from a steering wheel and a hands-free prohibited state in which the driver is prohibited to release the hands from the steering wheel; perform the information presentation related to a mode transition from the monitoring interruption mode to the monitoring-required mode when the mode transition occurs; and control a traveling speed of the vehicle to be lower when the monitoring interruption mode is transitioned to the hands-free prohibited state of the monitoring-required mode than when the monitoring interruption mode is transitioned to the hands-free permitted state of the monitoring-required mode.

EMBODIMENTS

Figure 1:
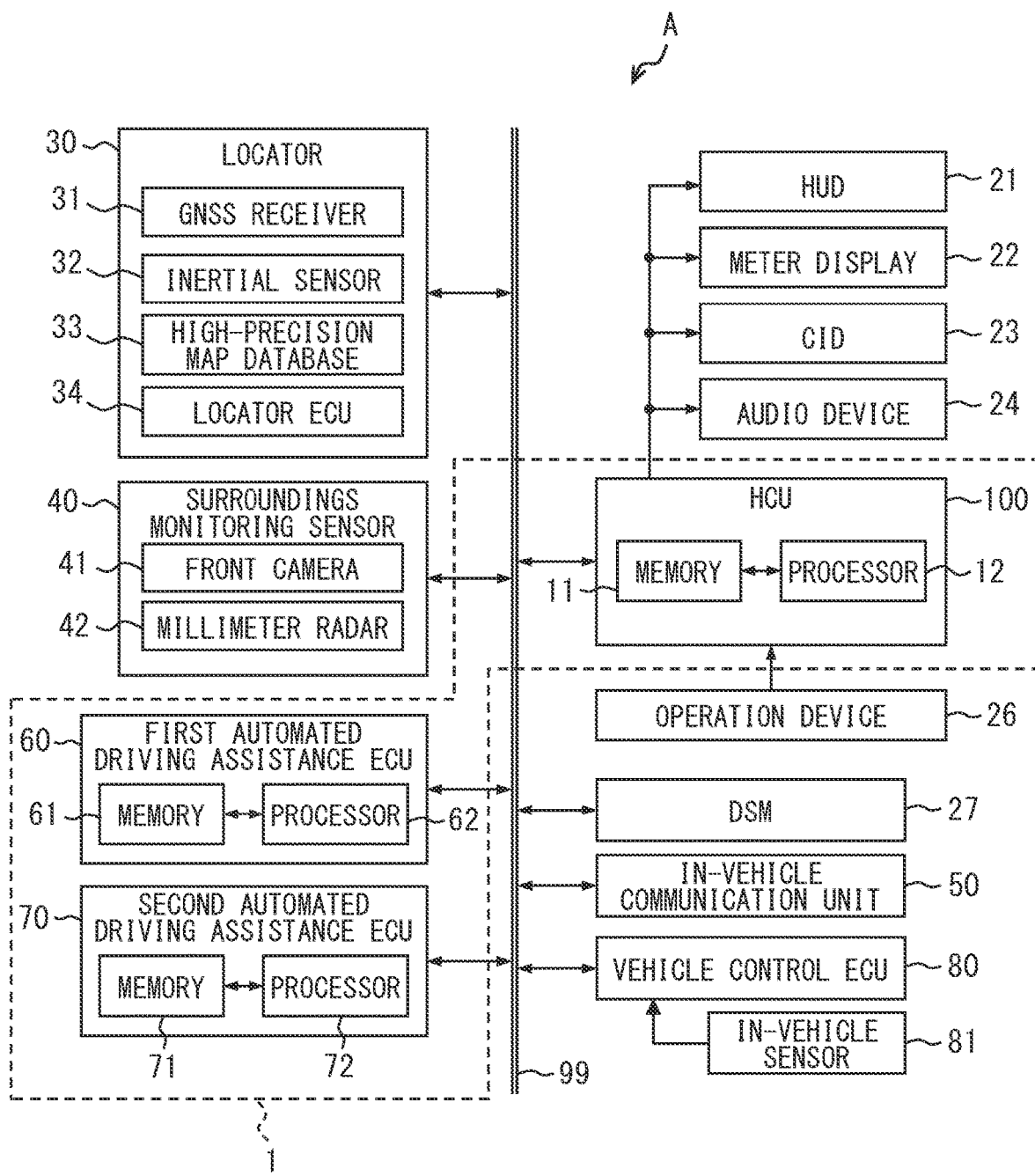
FIG. 1 is a diagram illustrating a system including a presentation control device.

In automated driving, there may be a case where a mode in which interruption of surroundings monitoring is permitted is switched to a mode in which a driver is required to perform the surroundings monitoring. In addition, in the mode in which the surroundings monitoring is required, there may be a case where hands are permitted to be released from a steering wheel and a case where hands are prohibited from being released from the steering wheel.

First Embodiment

A presentation control device according to a first embodiment is described with reference to FIGS. 1 to 9. The presentation control device according to the first embodiment is provided by a human machine interface control unit (HCU) mounted in a vehicle A. The HCU 100 includes a human machine interface (HMI) system used in the vehicle A together with a plurality of display devices, an audio device 24, an operation device 26, and the like. The HMI system has an input interface function of receiving an operation by a passenger (for example, a driver or the like) of the vehicle A and an output interface function of presenting information to the driver. The HCU 100 is connected to a locator 30, a surroundings monitoring sensor 40, an in-vehicle communication unit 50, a first automated driving ECU 60, a second automated driving ECU 70, a DSM 27, and a vehicle control ECU 80 via a communication bus 99 and the like. The HCU 100, the first automated driving ECU 60, and the second automated driving ECU 70 constitute an automated driving control system 1.

The locator 30 generates own vehicle position information or the like by composite positioning for combining a plurality of acquired information items. The locator 30 includes a global navigation satellite system (GNSS) receiver 31, an inertial sensor 32, a map database (hereinafter referred to as "map DB") DB 33, and a locator ECU 34. The GNSS receiver 31 receives positioning signals from a plurality of positioning satellites. The inertial sensor 32 is a sensor that detects inertial force acting on the vehicle A. The inertial sensor 32 includes a gyro sensor and an acceleration sensor, for example.

The map DB 33 is a nonvolatile memory and stores link data, node data, and map data of road shapes, structures, and the like. The map data may be a three-dimensional map including a point group of characteristic points of the road shapes and the structures. The three-dimensional map may be generated by Road Experience Management (REM) based on a captured image. In addition, the map data may include traffic regulation information, road construction information, weather information, signal information, and the like. The map data stored in the map DB is updated regularly or at any time based on the latest information received by the in-vehicle communication unit 50 to be described later.

The locator ECU 34 mainly includes a microcomputer including a processor, a memory, an input and output interface, and a bus that connects the processor, the memory, and the input and output interface to each other. The locator ECU 34 sequentially positions the position (hereinafter referred to as own vehicle position) of the vehicle A by combining the map data of the map DB 33 and a result of measurement by the inertial sensor 32. The own vehicle position may be represented by latitude and longitude coordinates, for example. For the positioning of the own vehicle position, a traveling distance calculated from a signal sequentially output from a vehicle speed sensor mounted in the vehicle A may be used. When a three-dimensional map of a point group of characteristic points of road shapes and structures is used as the map data, the locator ECU 34 may be configured to identify the own vehicle position using this three-dimensional map and a result of detection by the surroundings monitoring sensor 40 without using the GNSS receiver 31.

The surroundings monitoring sensor 40 is an autonomous sensor that monitors an environment surrounding the vehicle A. The surroundings monitoring sensor 40 can detect moving objects such as a pedestrian, a cyclist, an animal other than humans, and other vehicles, a fallen object on a road, a guardrail, a curb, a road sign, a road marking such as a driving lane marking, and a stationary object such as a roadside structure. The surroundings monitoring sensor 40 provides detected information obtained by detecting an object present around the vehicle A to the first automated driving ECU 60, the second automated driving ECU 70, and the like via the communication bus 99.

The surroundings monitoring sensor 40 includes a front camera 41 and millimeter wave radars 42 as a detection configuration for detecting an object. The front camera 41 outputs, as detected information, at least one of imaging data obtained by imaging a front range of the vehicle A and a result of analyzing the imaging data. The plurality of millimeter wave radars 42 are arranged at intervals on each of front and rear bumpers of the vehicle A, for example. The millimeter wave radars 42 emit millimeter waves or quasi-millimeter waves to the front range, a front side range, a rear range, a rear side range, and the like of the vehicle A. The millimeter wave radars 42 generate detected information by a process of receiving waves reflected on a moving object, a stationary object, and the like. The surroundings monitoring sensor 40 may include another detection configuration such as Light Detection and Ranging/Laser Imaging Detection and Ranging (LiDAR) for detecting a point group of characteristic points of features, or a sonar for receiving a reflected ultrasonic wave.

The in-vehicle communication unit 50 is a communication module mounted in the vehicle A. The in-vehicle communication unit 50 has at least a function for vehicle to cellular network (V2N) communication in accordance with communication standards such as Long-Term Evolution (LTE) and 5G, and transmits and receives a radio wave to and from a base station present around the vehicle A. The in-vehicle communication unit 50 may have functions for vehicle to roadside infrastructure (hereinafter referred to as "V2I") communication, vehicle to vehicle (hereinafter referred to as "V2V") communication, and the like. The in-vehicle communication unit 50 can coordinate with a cloud and an in-vehicle system via the V2N communication (cloud to car). Since the in-vehicle communication unit 50 is mounted, the vehicle A is a connected car that is connectable to the Internet. The in-vehicle communication unit 50 acquires congestion information distributed from a traffic information center or the like and provides the acquired congestion information to the second automated driving ECU 70, the HCU 100, and the like.

The first automated driving ECU 60 and the second automated driving ECU 70 mainly include computers including processors 62 and 72, memories 61 and 71, input and output interfaces, buses that connect the processors 62 and 72, the memories 61 and 71, and the input and output interfaces to each other, and the like, respectively. The first automated driving ECU 60 and the second automated driving ECU 70 are ECUs that can perform automated driving control to partially control driving of the vehicle A or to control substantially all the driving of the vehicle A.

The first automated driving ECU 60 has a partial automated driving function of partially performing a driving operation of the driver on behalf of the driver. The second automated driving ECU 70 has an automated driving function capable of performing a driving operation of the driver on behalf of the driver. As an example, regarding automated driving levels defined by the Society of Automotive Engineers, the first automated driving ECU 60 can perform partial automated driving control (advanced driving assistance) of Level 2 or lower. That is, the first automated driving ECU 60 can perform automated driving control that requires the driver to monitor the surroundings. In other words, the first automated driving ECU 60 can perform automated driving in which a second task to be described later is prohibited.

For example, the first automated driving ECU 60 can perform either one or both of control of the vehicle A in a longitudinal direction and control of the vehicle A in a lateral direction. In this case, the longitudinal direction matches a front-rear direction of the vehicle A, and the lateral direction matches a width direction of the vehicle A. The first automated driving ECU 60 controls acceleration and deceleration of the vehicle A as the control in the longitudinal direction. In addition, the first automated driving ECU 60 controls a steering angle of a steering wheel of the vehicle A as the control in the horizontal direction.

Figure 2:
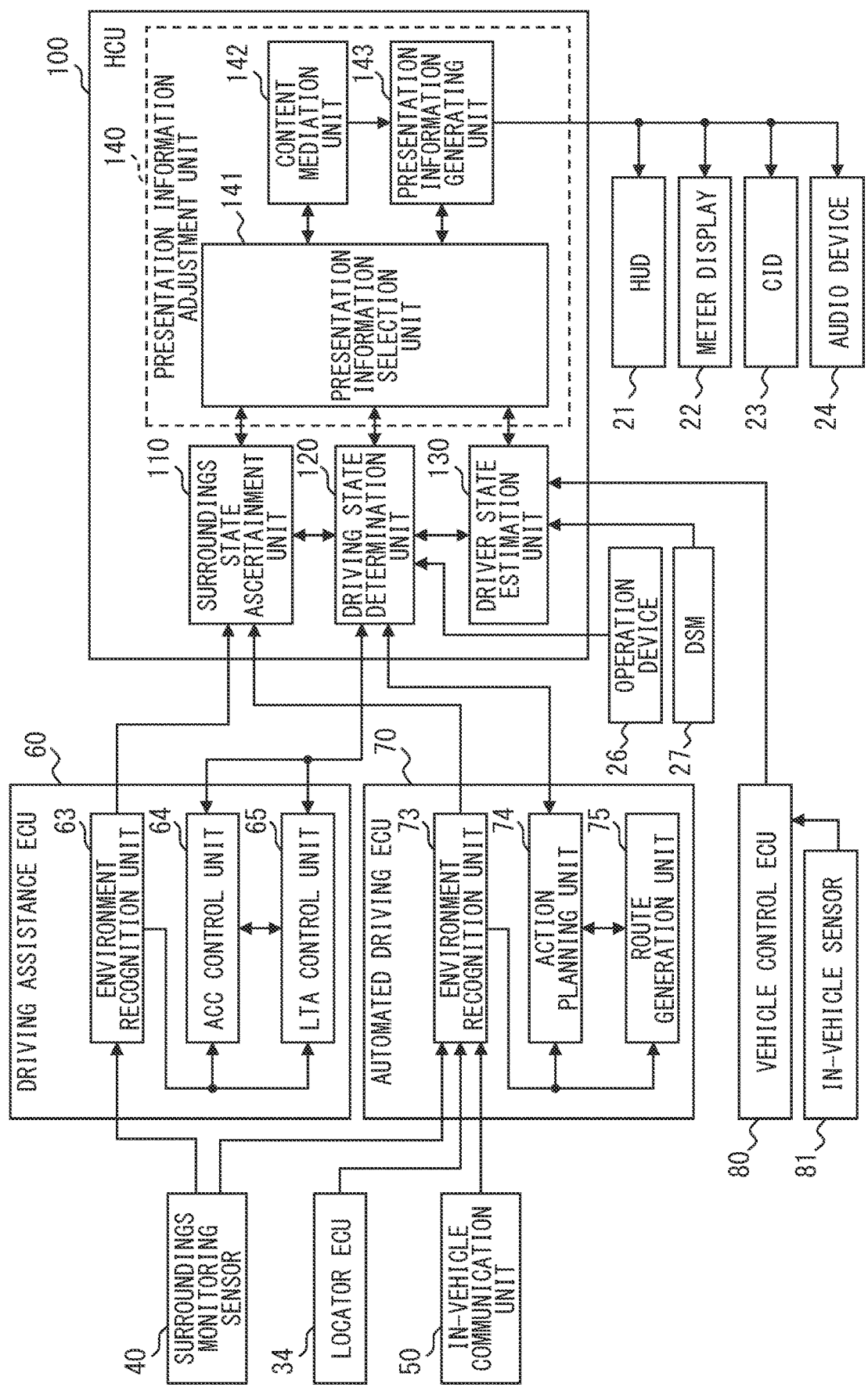
FIG. 2 is a block diagram illustrating an example of functions included in the presentation control device.

The first automated driving ECU 60 causes a driving assistance program stored in the memory 61 to cause the processor 62 to execute a plurality of commands, thereby building a plurality of functions of implementing the above-described advanced driving assistance. Specifically, as illustrated in FIG. 2, the first automated driving ECU 60 builds functional units such as an environment recognition unit 62, an ACC control unit 64, and an LTA control unit 65.

The environment recognition unit 63 recognizes a traveling environment around the vehicle A based on the detected information acquired from the surroundings monitoring sensor 40. The environment recognition unit 63 provides, as analyzed detected information, a result of analyzing the detected information for the recognition of the traveling environment to the ACC control unit 64 and the LTA control unit 65. As an example, the environment recognition unit 63 generates, as the analyzed detected information, information (lane information) indicating relative positions and shapes of left and right lane markings of a lane (hereinafter referred to as a current lane) in which the vehicle A currently travels, or relative positions and shapes of roadsides. In addition, the environment recognition unit 63 generates, as the analyzed detected information, information (preceding vehicle information) indicating the presence or absence of a preceding vehicle that precedes the vehicle A in the current lane, and the position and speed of the preceding vehicle when the preceding vehicle is present. The environment recognition unit 63 sequentially provides the preceding vehicle information to the ACC control unit 64 and sequentially provides the lane information to the LTA control unit 65. The environment recognition unit 63 may be configured to recognize an MD area, an AD area, an ST section, and a non-ST section that will be described later.

The ACC control unit 64 performs, based on the preceding vehicle information, adaptive cruise control (ACC) control to enable the vehicle A to travel at a constant speed, which is a target speed, or enable the vehicle A to follow the preceding vehicle. The LTA control unit 65 performs Lane Tracing Assist (LTA) control to maintain the vehicle A traveling in a lane. Specifically, each of the control units 64 and 65 generates a command to control acceleration or deceleration or a command to control the steering angle and provides the command to the vehicle control ECU 80 to be described later. The ACC control is an example of the control in the longitudinal direction. The LTA control is an example of the control in the lateral direction.

The first automated driving ECU 60 performs both of the ACC control and the LTA control to implement automated driving of Level 2. The first automated driving ECU 60 may perform either the ACC control or the LTA control to implement automated driving of Level 1.

On the other hand, regarding the above-described automated driving levels, the second automated driving ECU 70 can control automated driving of Level 3 or higher. That is, the second automated driving ECU 70 can perform automated driving in which the driver is permitted to interrupt the surroundings monitoring. In other words, the second automated driving ECU 70 can perform automated driving in which the second task is permitted.

The second task is an operation that is permitted to be performed by the driver and excludes driving. The second task is a specific operation defined in advance. In an automated driving period in which the vehicle A automatically travels by a Level 3 automated driving function by the second automated driving ECU 70, the driver is a person (passenger) who takes over the right of controlling the driving from an automated driving system when leaving a limited region or in an emergency. Until a request to perform a driving operation by the automated driving system, that is, a request (take-over request) to take over the driving occurs, the driver may be legally permitted to perform the second task.

The second task may be referred to as a secondary activity, the other activity, or the like. The second task must not prevent the driver from handling the request to take over the driving operation from the automated driving system. As an example, it is assumed that the second task is viewing a content CTv such as a video image, operating a smartphone, reading a book, eating a meal, or the like.

The second automated driving ECU 70 causes an automated driving program stored in the memory 71 to cause the processor 72 to execute a plurality of commands, thereby building a plurality of functional units that implement the above-described automated driving. Specifically, the second automated driving ECU 70 builds an environment recognition unit 73, an action planning unit 74, a route generation unit 75, and the like as functional units.

The environment recognition unit 73 recognizes a traveling environment around the vehicle A based on the detected information acquired from the surroundings monitoring sensor 40, the own vehicle position and map data acquired from the locator ECU 34, the communication information acquired from the in-vehicle communication unit 50, and the like. As an example, the environment recognition unit 73 recognizes the position of the current lane of the vehicle A, the shape of the current lane, a relative position and a relative speed of a moving object present around the vehicle A, and the like. The environment recognition unit 73 sequentially provides the above-described results of the recognition to the action planning unit 74 and the route generation unit 75.

In addition, the environment recognition unit 73 determines a manual driving area (MD area) and an automated driving area (AD area) in a traveling region of the vehicle A, and determines an ST section and a non-ST section in the AD area. The environment recognition unit 73 sequentially provides the results of the recognition to the action planning unit 74, the HCU 100, and the like.

The MD area is an area in which the automated driving is prohibited. In other words, the MD area is an area in which the driver is required to perform all the control of the vehicle A in the longitudinal direction, the control of the vehicle B in the lateral direction, and the surroundings monitoring. For example, the MD area is an area in which the traveling road is a general road.

The AD area is an area in which the automated driving is permitted. In other words, the AD area is an area in which the vehicle A can perform one or more of the control in the longitudinal direction, the control in the lateral direction, and the surroundings monitoring on behalf. For example, the AD area is an area in which the traveling road is a highway or a vehicle-only road.

The AD area is divided into a non-ST section in which automated driving of Level 2 or lower can be performed and an ST section in which automated driving of Level 3 or higher can be performed. In the first embodiment, it is assumed that the non-ST section in which automated driving of Level 1 is permitted and the non-ST section in which automated driving of Level 2 is permitted are equivalent.

The ST section is, for example, a traveling section (congestion section) in which congestion occurs. When a state in which the traveling speed of the vehicle A is in a threshold range continues for a predetermined time period, a surroundings state ascertainment unit 110 determines that the traveling section is the ST section. In addition, the surroundings state ascertainment unit 110 may combine the own vehicle position with the congestion information acquired from the in-vehicle communication unit 50 and determine whether or not the traveling section is the ST section. The surroundings state ascertainment unit 110 may determine that a section in which a specific condition that is related to the environment surrounding the vehicle A and is not congestion is established is an ST section, in addition to a congestion section.

The action planning unit 74 determines a future action scheduled for the vehicle A based on a result of recognizing the traveling environment. Specifically, when the action planning unit 74 already acquires an instruction to start the automated driving in collaboration with the HCU 100 to be described later, the action planning unit 74 determines, as a future action, the type of an action to be performed by the vehicle A in order to reach a target location. Examples of the type include, for example, traveling straight, turning right, turning left, changing a lane, and the like. In addition, when the action planning unit 74 determines that it is necessary to transfer the right of controlling the driving to the driver, the action planning unit 74 generates a take-over request and provides the take-over request to the HCU 100. For example, the action planning unit 74 generates the take-over request when the vehicle approaches a point where the ST section is switched to the non-ST section or the MD area.

The route generation unit 75 generates, based on a result of recognizing the traveling environment and the determined future action, a traveling route of the vehicle A in a section in which the automated driving can be performed. The traveling route includes, for example, a target position of the vehicle A based on progress, a target speed at each target position, and the like. The route generation unit 75 sequentially provides, to the vehicle control ECU 80, the generated traveling route as a control command to be followed by the vehicle A in the automated driving.

The automated driving control system 1 including the above-described automated driving ECUs 60 and 70 can perform at least automated driving corresponding to Level 2 and Level 3 on the vehicle A. Automated driving Level 2 is an example of a "monitoring required mode" and automated driving Level 3 is an example of a "monitoring interruption mode". The transition from automated driving Level 3 to automated driving Level 2 is an example of "mode transition".

The vehicle control ECU 80 is an electronic control device that performs acceleration and deceleration control and steering control on the vehicle A. As the vehicle control ECU 80, a steering ECU that performs the steering control, a power unit control ECU and a braking ECU that perform the acceleration and deceleration control, and the like are provided. The vehicle control ECU 80 acquires a detection signal output from each of sensors that are mounted in the vehicle A and are the steering angle sensor, the vehicle speed sensor, and the like. The vehicle control ECU 80 outputs a control signal to each of traveling control devices such as an electronic control throttle, a brake actuator, and an electric power steering (EPS) motor. The vehicle control ECU 80 acquires an instruction to control the vehicle A from the first automated driving ECU 60 or the second automated driving ECU 70 and controls each of the traveling control devices to enable the automated driving in accordance with the control instruction.

In addition, the vehicle control ECU 80 is connected to an in-vehicle sensor 81 that detects driving operation information of a driving member by the driver. The in-vehicle sensor 81 includes a pedal sensor that detects an amount of depression of an acceleration pedal, a steering sensor that detects a steering amount of the steering wheel, and the like. The in-vehicle sensor 81 may include a grip sensor that detects gripping of the steering wheel. The vehicle control ECU 80 sequentially provides the detected driving operation information to the HCU 100.

The DSM 27 includes a near-infrared light source, a near-infrared camera, and a control unit that controls the near-infrared light source and the near-infrared camera. The DSM 27 is mounted on an upper surface of a steering column unit, an upper surface of an instrument panel 9, or the like in a state in which the near-infrared camera is oriented toward a head rest portion of a driver seat. The DSM 27 causes the near-infrared camera to image a head part of the driver irradiated with near-infrared light by the near-infrared light source. An image captured by the near-infrared camera is analyzed by a control unit. The control unit extracts, from the captured image, information of the positions of eye points of the driver, a line of sight of the driver, and the like and provides the extracted state information of the driver to the HCU 100 and the like via the communication bus 99.

Figure 3:
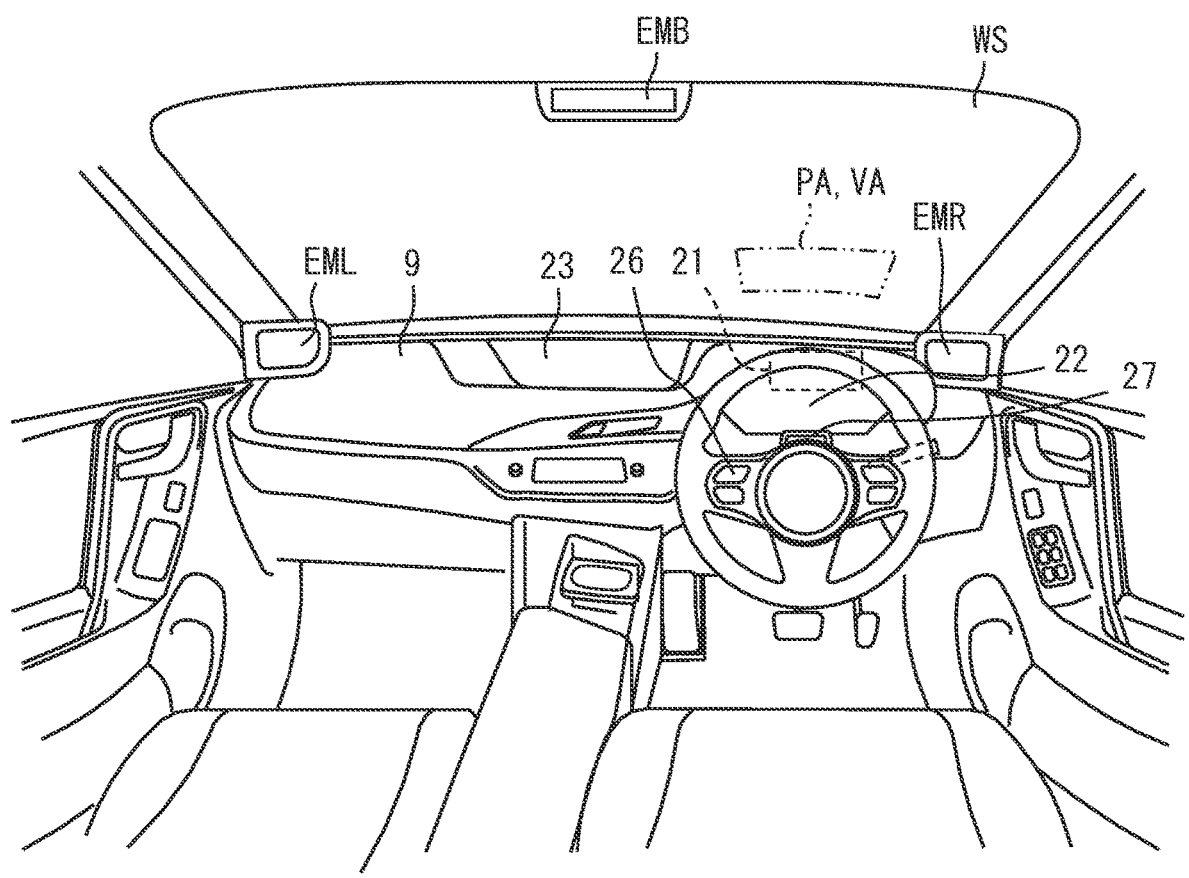
FIG. 3 is a diagram illustrating a vehicle interior.
Figure 4:
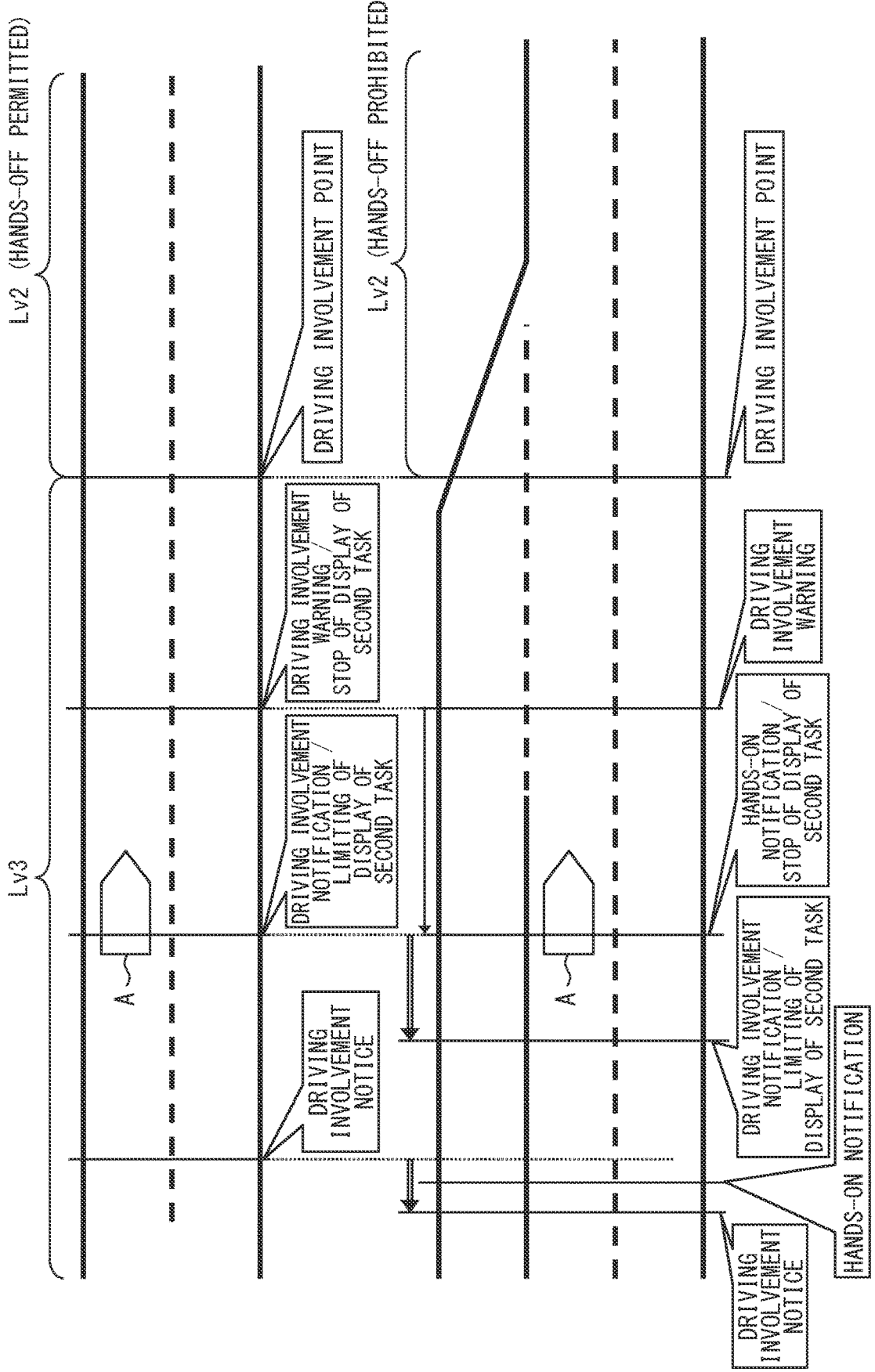
FIG. 4 is a diagram illustrating an example of a timing of presenting information.

Next, details of the plurality of display devices, the audio device 24, and the operation device 26 that are included in the HMI system, and the HCU 100 are described with reference to FIGS. 1 to 3.

The plurality of display devices include a head up display (hereinafter referred to as an HUD) 21, a meter display 22, a center information display (hereinafter referred to as an CID) 23, and the like. The plurality of display devices may further include each of displays EMB, EML, and EMR of an electronic mirror system. The HUD 21, the meter display 22, and the CID 23 are display units that present an image content such as a still image or a video image as visual information.

The HUD 21 projects light of an image formed in front of the driver onto a projection region PA defined by a wind shield WS or the like based on a control signal and video data acquired from the HCU 100. The light of the image reflected toward the inside of the vehicle interior by the wind shield WS is perceived by the driver sitting in the driver seat. The HUD 21 displays a virtual image in a space in front of the projection region PA. The driver visually recognizes the virtual image in an angular field VA of view displayed by the HUD 21 while the virtual image overlaps the foreground of the vehicle A.

Each of the meter display 22 and the CID 23 mainly includes a liquid display, an organic light emitting diode display (OLED), or the like. Each of the meter display 22 and the CID 23 displays various images on a display screen based on a control signal and video data acquired from the HCU 100. The meter display 22 is mounted on a front surface of the driver seat, for example. The CID 23 is provided on a central region in a vehicle width direction on the front side of the driver. For example, the CID 23 is provided above a center cluster of the instrument panel 9. The CID 23 has a touch panel function and detects, for example, a touch operation, a swipe operation, and the like by the driver or the like on the display screen.

The audio device 24 has a plurality of speakers installed in the vehicle interior. The audio device 24 presents a notification sound, an audio message, or the like as auditory information to the driver based on a control signal and audio data acquired from the HCU 100. That is, the audio device 24 is an information presentation device that can present information in a format different from the visual information.

The operation device 26 is an input unit that accepts a user device by the driver or the like. A user operation or the like related to the start and stop of each of the levels of the automated driving functions is input to the operation device 26. For example, the operation device 26 includes a steering switch provided in a spoke unit of the steering wheel, an operation lever provided in a steering column unit, an audio input device that recognize words spoken by the driver, and the like.

The HCU 100 controls the presentation of information to the driver based on information from the above-described first automated driving ECU 60, the second automated driving ECU 70, and the like. The HCU 100 mainly includes a computer including a memory 11, a processor 12, an input and output interface, a bus connecting the memory 11, the processor 12, and the input and output interface to each other, and the like. The processor 12 is hardware for performing arithmetic processing. The processor 12 includes at least one type of a central processing unit (CPU), a graphics processing unit (GPU), a reduced instruction set computer (RISC)-CPU, and the like as a core.

The memory 11 non-temporarily stores or saves a computer-readable program, data, and the like. For example, the memory 11 is at least one type of non-transitory tangible storage medium among a semiconductor memory, a magnetic medium, an optical medium, and the like. The memory 11 stores various programs that are a presentation control program to be described later and the like and are to be executed by the processor 12.

The processor 12 executes a plurality of commands included in the presentation control program stored in the memory 11. As a result, the HCU 100 builds a plurality of functional units for controlling presentation to the driver. In this manner, in the HCU 100, the presentation control program stored in the memory 11 causes the processor 12 to execute the plurality of commands, whereby the plurality of functional units are built. Specifically, as illustrated in FIG. 2, in the HCU 100, the functional units such as the surroundings state ascertainment unit 110, a driving state determination unit 120, a driver state estimation unit 130, and a presented information adjustment unit 140 are built.

The surroundings state ascertainment unit 110 acquires a result of recognizing the traveling environment from the environment recognition unit 63 of the first automated driving ECU 60 or the environment recognition unit 73 of the second automated driving ECU 70. The surroundings state ascertainment unit 110 ascertains the surroundings state of the vehicle A based on the acquired result of recognizing the traveling environment. Specifically, the surroundings state ascertainment unit 110 ascertains a remaining distance from the vehicle A to a driving involvement point.

After passage through the driving involvement point, that is, after transition to the automated driving Level 2, the driving state determination unit 120 determines whether or not hands-off is permitted. For example, the driving state determination unit 120 determines that the hands-off is prohibited in a specific traveling state in which a steering operation by the driver is relatively likely to be required. Specifically, in a case where the traveling section is a two-way traffic section after the passage through the driving involvement point, high-accurate map data is not present after the passage through the driving involvement point, a road structure after the passage through the driving involvement point is a specific structure, or the like, the driving state determination unit 120 determines that the hands-off is prohibited. In this case, examples of the specific structure include a junction, a curve, a tunnel, and the like.

Hereinafter, a state in which the hands-off is permitted may be referred to as a "hands-off permitted state" and a state in which the hands-off is prohibited may be referred to as a "hands-off prohibited state". The hands-off prohibited state may include not only a specific state during automated driving of Level 2 but also a state during automated driving of Level 1 or a manual driving state. The hands-off permitted state is an example of a "hands-free permitted state" and the hands-off prohibited state is an example of a "hands-free prohibited state". The transition from automatic driving Level 2 to automated driving Level 3 of the hands-off permitted state is an example of "interruption mode transition".

The surroundings state ascertainment unit 110 sequentially presents ascertained surroundings state information to the driving state determination unit 120. The surroundings state ascertainment unit 110 may ascertain the surroundings state based on information directly acquired from the locator ECU 34, the surroundings monitoring sensor 40, and the like, instead of the recognition results acquired from the automated driving ECUs 60 and 70.

The driver state estimation unit 130 estimates the driver state based on information from the DSM 27, the vehicle control ECU 80, and the like. For example, the driver state estimation unit 130 estimates, as the driver state, whether or not each body part of the driver is involved in a driving operation. Specifically, the driver state estimation unit 130 determines whether or not eye parts of the driver are monitoring the surroundings based on state information related to the line-of-sight direction of the driver and acquired from the DSM 27. In addition, the driver state estimation unit 130 determines whether or not the driver grips the steering wheel with the hands based on the steering amount acquired from the vehicle control ECU 80. The driver state estimation unit 130 may determine whether or not the driver grips the steering wheel based on information detected by the grip sensor or the like. The driver state estimation unit 130 sequentially provides the estimated driver state to the driving state determination unit 120.

The driving state determination unit 120 controls the transfer of the right of controlling the driving between the vehicle A and the driver in collaboration with the second automated driving ECU 70 and the first automated driving ECU 60. Specifically, the driving state determination unit 120 controls the transfer of the right of controlling the driving from the vehicle A to the driver, particularly, the transition (mode transition) from automated driving Level 3 to automated driving Level 2. For example, when the vehicle A reaches the point (driving involvement point) where switching to the non-ST section is performed during traveling in the ST section, the driving state determination unit 120 transfers the right of controlling the driving to the driver. In this case, the driver needs to perform the surroundings monitoring among driving operations. In addition, the second task is prohibited from being performed by the driver. In addition, the control of the vehicle A in the longitudinal direction and the control of the vehicle A in the lateral direction are taken over from the second automated driving ECU 70 to the first automated driving ECU 60.

When the take-over is completed before arrival at a point where the ST section is switched to the non-ST section or the MD area, the driving state determination unit 120 switches the automated driving mode from Level 3 to a mode of Level 2 or lower or a manual driving mode. In this case, the driver takes over at least obligation to perform the surroundings monitoring from the vehicle A. That is, the switching point can be the driving involvement point where involvement in the driving of the driver is required. The above-described driving state determination unit 120 is an example of a "determination unit".

The presentation information adjustment unit 140 includes a presentation information selection unit 141, a content mediation unit 142, a presentation information generation unit 143 as subfunction units. The presentation information adjustment unit 140 is an example of a "presentation control unit".

The presentation information selection unit 141 coordinates with the content mediation unit 142 to control the presentation of a content related to the automated driving based on information acquired from the surroundings state ascertainment unit 110, the driving state determination unit 120, and the driver state estimation unit 130. Specifically, the presentation information selection unit 141 selects a content to be presented to each presentation device based on various types of information.

The content mediation unit 142 mediates a content to be displayed on each display device. The content mediation unit 142 comprehensively determines a priority of each content based on various types of information from the presentation information selection unit 141. The content mediation unit 142 selects a content determined to have a high priority as a content to be presented. In addition, the content mediation unit 142 can sequentially change, according to the priorities, a display size of each content to be displayed on each display device and a display layout. As an example, as the content has a higher priority, the content mediation unit 142 increases the display size of the content. As another example, as a content has a higher priority, the content mediation unit 142 positions the content further on the front side of each display region.

The presentation information generation unit 143 generates, based on the selection result of the presentation information selection unit 141 and the mediation result of the content mediation unit 142, a control signal and video data to be provided to each display device and a control signal and video data to be provided to the audio device 24. The presentation information generation unit 143 outputs the generated control signals and the data to each presentation device to present the information to each presentation device.

Next, contents presented by the HCU 100 in a driving take-over scene are described below with reference to FIGS. 4 to 7. The HCU 100 performs driving involvement notice, driving involvement notification, driving involvement warning, hands-on notification, and the like as information presentation that prompts the driver to start the involvement in the driving. The HCU 100 starts to perform the above-described presentation according to a distance to the driving involvement point.

Figure 5:
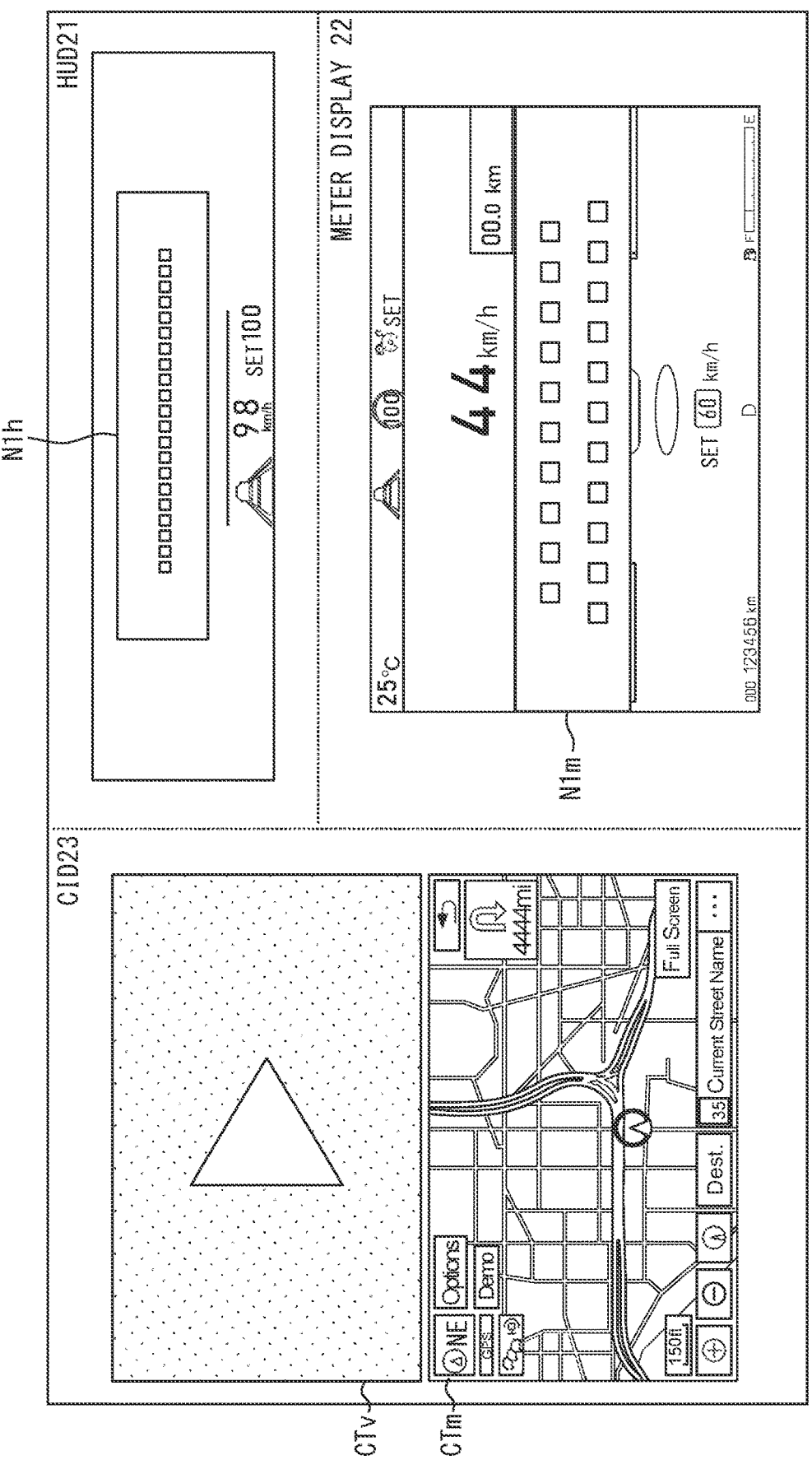
FIG. 5 is a diagram illustrating an example of information presentation.

The driving involvement notice is to give, to the driver, a notice indicating that the involvement in the driving will be required in the future. For example, as illustrated in FIG. 5, the presentation information adjustment unit 140 displays notice messages N1h and N1m to the HUD 21 and the meter display 22.

The notice messages N1h and N1m are image contents indicating, as visual information, a state in which the involvement in the driving is required. The notice messages N1h and N1m include a message image in which character information related to the involvement in the driving is described, and a window image that partitions the message image in a display region. The message image indicates that automated driving Level 3 will be canceled, such as "Automated driving Level 3 will be canceled in a short time." The notice messages N1h and N1m are arranged in a central portion in the display region.

When the remaining distance from the vehicle A to the driving involvement point becomes shorter than threshold distances L1A and L1B, the presentation information adjustment unit 140 starts the driving involvement notice. When the hands-off is permitted after the involvement in the driving, the presentation information adjustment unit 140 sets the threshold distance L1A. When the hands-off is prohibited, the presentation information adjustment unit 140 sets the threshold distance L1B. The threshold distance L1B is longer than the threshold distance L1A. That is, when the hands-off is prohibited, the driving involvement notice is presented at a point closer to the driving involvement point than in a case where the hands-off is permitted.

Figure 6:
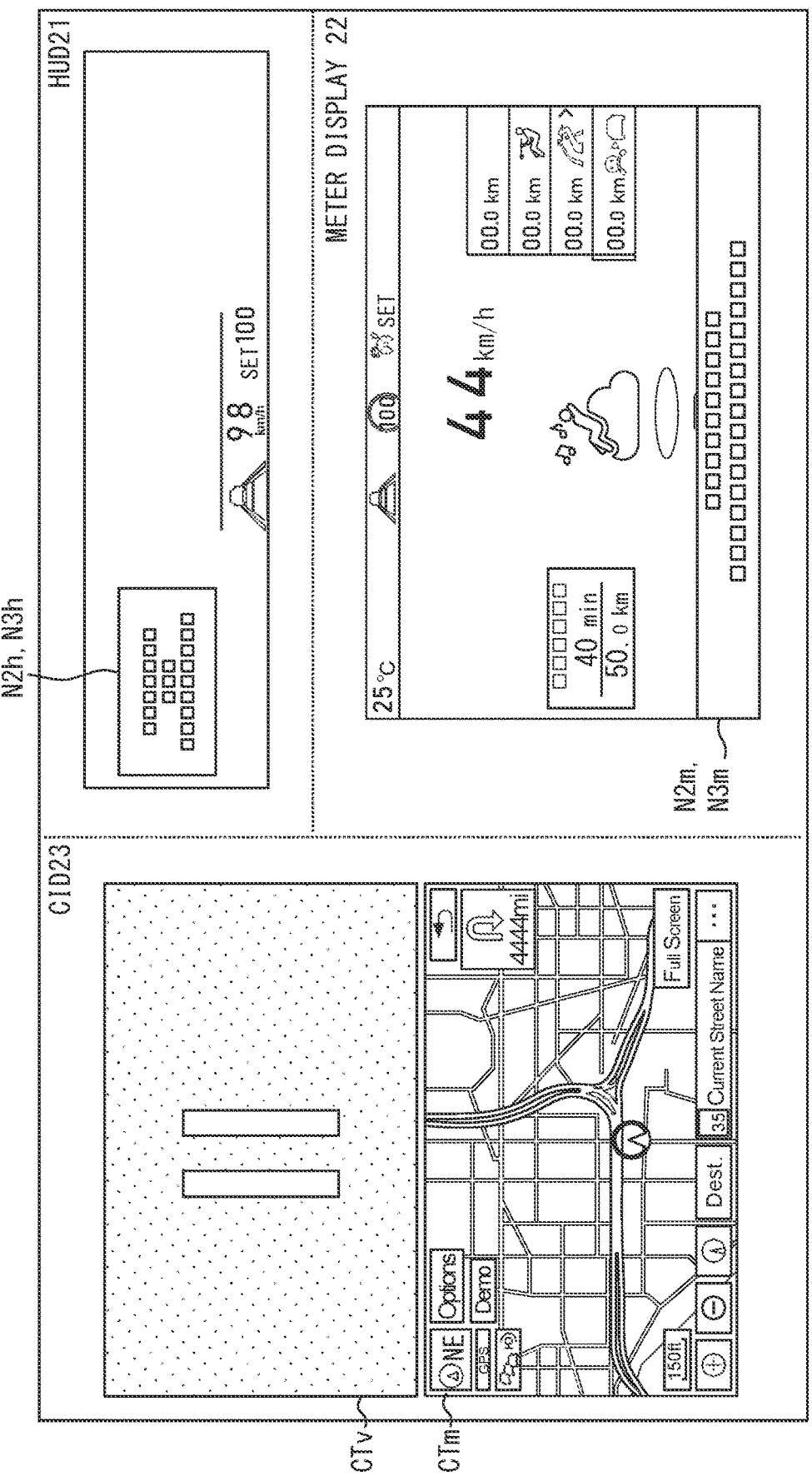
FIG. 6 is a diagram illustrating an example of information presentation.

The driving involvement notification is a notification that prompts to start a driving operation including at least the surroundings monitoring, that is, a notice that prompts the driver to be involved in the driving. For the driving involvement notice, as illustrated in FIG. 6, the presentation information adjustment unit 140 displays notification messages N2$h$ and N2$m$ to the HUD 21 and the meter display 22.

The notification messages N2$h$ and N2$m$ are visual information indicating a traveling mode in which the involvement in the driving will be required, particularly, image contents represented by description of characters. The notification messages N2$h$ and N2$m$ include, for example, a character message image and a frame-shaped winder image. The message image is, for example, a description indicating that "Automated driving Level 3 will be canceled. Please prepare for driving." An execution message N4$m$ is, for example, displayed on the left side in the angular field of view VA on the HUD 21. The execution message N4$m$ is, for example, displayed at a lower portion of the display screen on the meter display 22.

When the remaining distance from the vehicle A to the driving involvement point becomes shorter than threshold distances L2A and L2B shorter than the threshold distances L1A and L1B, the presentation information adjustment unit 140 displays a driving take-over notice. When the hands-off is permitted after the driving take-over, the presentation information adjustment unit 140 sets the threshold distance L2A. When the hands-off is prohibited, the presentation information adjustment unit 140 sets the threshold distance L2B. The threshold distance L2B is longer than the threshold distance L2A. That is, when the hands-off is prohibited, a driving take-over notification is displayed at a point closer to the driving involvement point than in a case where the hands-off is permitted.

The hands-on notification is a notification that requests the driver to transition from a hands-off state to a hands-on state, that is, requests the driver to grip the steering wheel. The hands-on notification is performed in a case where the level transitions from automated driving Level 3 to automated driving Level 2 of the hands-off prohibited state. The presentation information adjustment unit 140 displays hands-on messages N3$h$ and N3$m$ in the hands-on notification. The hands-on messages N3$h$ and N3$m$ are contents including, for example, a message image similar to that of the notification messages N2$h$ and N2$m$. The message image may be "Please grip the steering wheel." or the like, for example. Alternatively, the presentation information adjustment unit 140 may display an icon or the like indicating the gripping of the steering wheel in the hands-on notification.

For example, after performing the driving involvement notice and the driving involvement notification, the presentation information adjustment unit 140 performs the hands-on notification. In this case, the presentation information adjustment unit 140 may perform the hands-on notification when the remaining distance from the vehicle A to the driving involvement point becomes shorter than a threshold distance Lon and when the remaining distance from the vehicle A to the driving involvement point becomes shorter than a threshold distance L3. The threshold distance Lon is, for example, shorter than the threshold distance L1B and longer than the threshold distance L2B. The threshold distance L3$s$ is shorter than the threshold distance L2B and longer than the threshold distance L3. The hands-on notification after the driving involvement notification, that is, the second hands-on notification may be canceled when the driver is already in the hands-on state.

Figure 7:
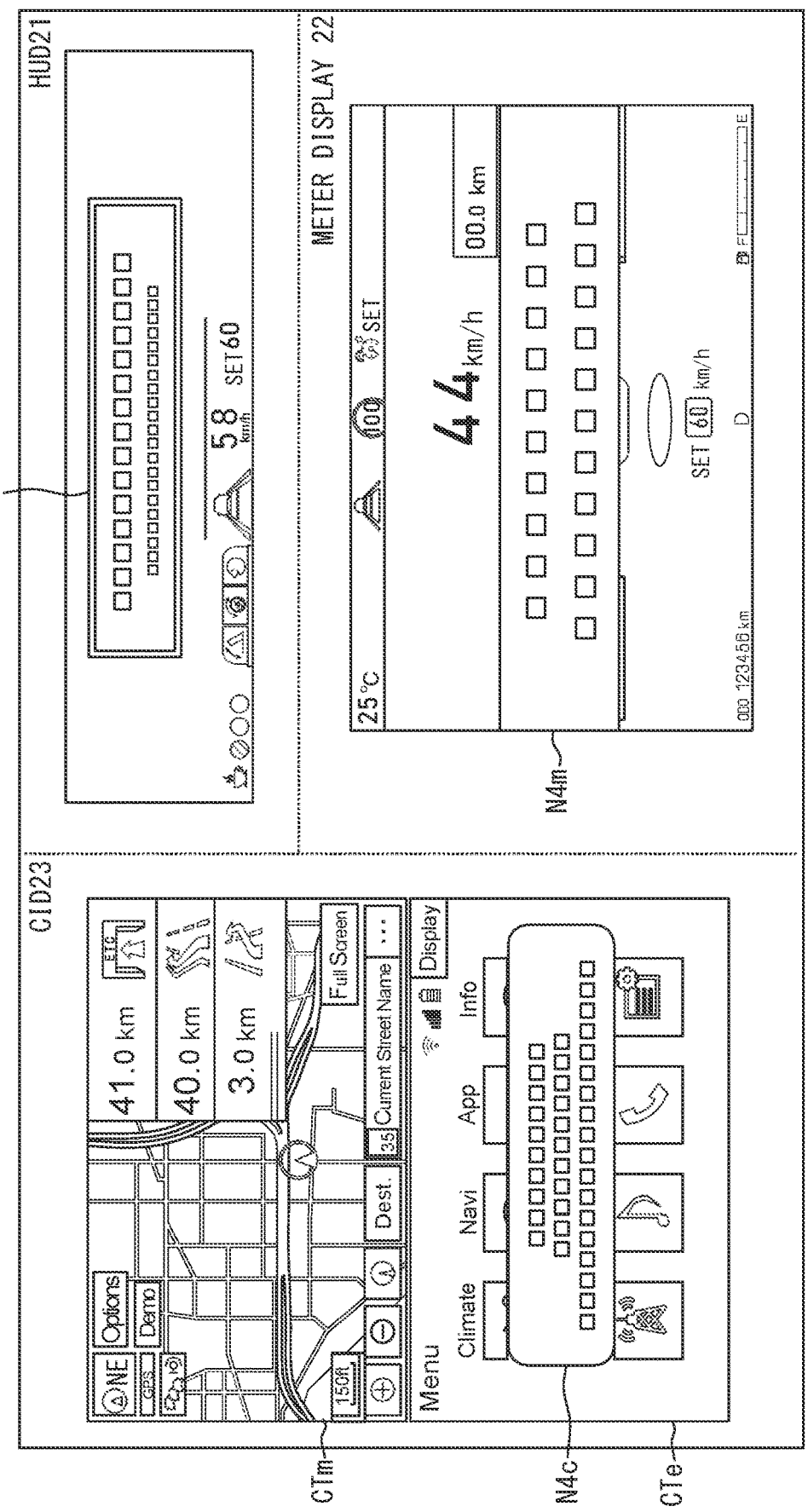
FIG. 7 is a diagram illustrating an example of information presentation.

The driving involvement warning notifies the driver that the mode transitions to a traveling mode in which the involvement in the driving is required after the driving involvement notification. As illustrated in FIG. 7, in the driving involvement warning, the presentation information adjustment unit 140 causes the HUD 21, the meter display 22, and the CID 23 to display warning messages N4$h$, N4$m$, and N4$c$.

The warning messages N4$h$, N4$m$, and N4$c$ are image contents indicating that the mode transitions to the traveling mode in which the involvement in the driving is required as visual information. The warning messages N4$h$, N4$m$, and N4$c$ include a message image and a window image. The message image is, for example, character information such as "Automated driving Level 3 will be canceled. Please prepare for driving."

When the remaining distance from the vehicle A to the driving involvement point becomes shorter than the threshold distance L3 shorter than the threshold distances L2A and L2B, the presentation information adjustment unit 140 displays the driving take-over notice. The presentation information adjustment unit 140 sets the common threshold distance L3 regardless of whether or not the hands-off is permitted after the driving take-over. As a result, regardless of whether the hands-off is permitted or is not permitted after the driving take-over, a driving take-over warning is displayed at a point close to the driving involvement point by the same distance.

In addition, when a second task related content is displayed during automated driving of Level 3, the presentation information adjustment unit 140 performs limited presentation that limits the display of the content. Specifically, the presentation information adjustment unit 140 limits the display in a stepwise manner by limiting the display of the second task and stopping the display of the second task according to the remaining distance to the driving involvement point.

In limiting the display of the second task, the presentation information adjustment unit 140 limits the display of the second task related content. Specifically, when a video image content is displayed as the second task related content, the presentation information adjustment unit 140 temporarily stops the reproduction of the video image content (see FIG. 6). The presentation information adjustment unit 140 may limit the display of the second task related content by processing of reducing visibility, such as reducing the size of the display region of the second task related content, reducing the luminescence of the display region of the second task related content, increasing the transmittance of the display region of the second task related content, or the like.

The presentation information adjustment unit 140 limits the display of the second task when the remaining distance to the driving involvement point becomes shorter than the threshold distances L2A and L2B. That is, the presentation information adjustment unit 140 starts limiting the display of the second task at substantially the same time of the start of the driving take-over notification. When the hands-off is prohibited, the display of the second task is limited at a point closer to the driving involvement point than in a case where the hands-off is permitted.

In stopping the display of the second task, the presentation information adjustment unit 140 completely stops displaying the second task related content (see FIG. 7). In this case, the presentation information adjustment unit 140 returns the display region of the second task related content to the initial display. The presentation information adjustment unit 140 stops displaying the second task when the remaining distance to the driving involvement point becomes shorter than the threshold distances L3 and L3s. That is, after the driving take-over, when the hands-off is prohibited, the display of the second task is stopped at a point closer to the driving involvement point than in a case where the hands-off is permitted. When the hands-off is prohibited, the display of the second task is stopped at the same time as the second hands-on notification.

Specifically, the presentation information adjustment unit 140 sets the threshold distance L3 when the hands-off after the involvement in the driving is permitted. The presentation information adjustment unit 140 sets the threshold distance L3s when the hands-off is prohibited. The threshold distance L3s is shorter than the threshold distance L2B and longer than the threshold distance L3. That is, when the hands-off after the involvement in the driving is permitted, the presentation information adjustment unit 140 stops displaying the second task at substantially the same time as the driving take-over warning. When the hands-off is prohibited, the presentation information adjustment unit 140 stops displaying the second task before the display of the driving take-over warning.

Figure 8:
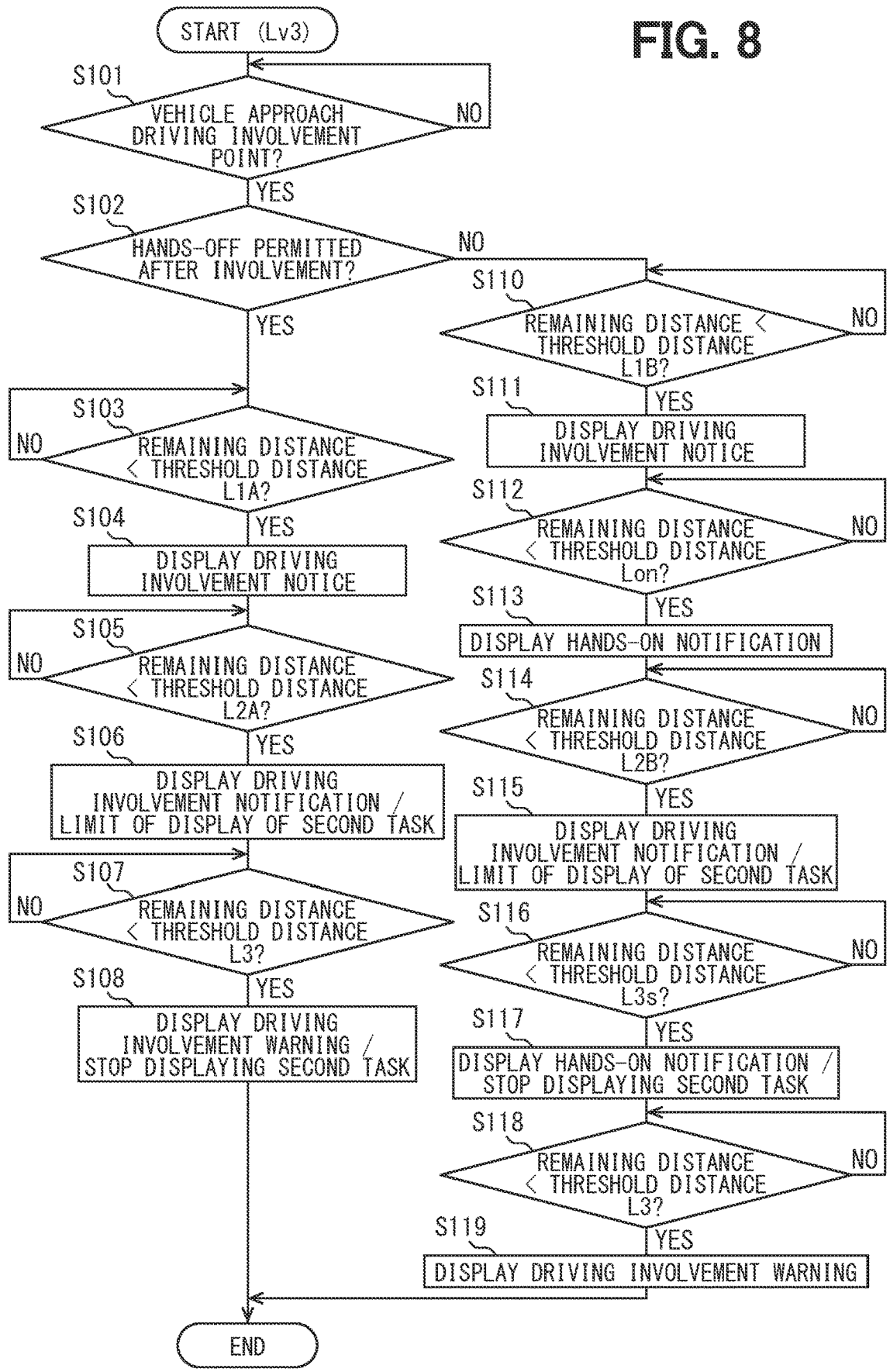
FIG. 8 is a flowchart illustrating an example of a presentation control method performed by an HCU.

Next, the flow of a presentation control method to be performed by the HCU 100 in collaboration with functional blocks is described below with reference to FIG. 8. In the flow to be described below, "S" means a plurality of steps of the flow to be executed according to a plurality of commands included in the presentation control program.

First, in S101, the surroundings state ascertainment unit 110 determines whether or not the vehicle A has approached the driving involvement point. When the surroundings state ascertainment unit 110 determines that the vehicle A has approached the driving involvement point, the surroundings state ascertainment unit 110 determines whether or not the hands-off can be permitted after the involvement in the driving in S102. When the surroundings state ascertainment unit 110 determines that the hands-off can be permitted, the surroundings state ascertainment unit 110 determines whether or not the remaining distance from the vehicle A to the driving involvement point is shorter than the threshold distance L1A in S103.

When the surroundings state ascertainment unit 110 determines that the remaining distance is shorter than the threshold distance L1A, the presentation information adjustment unit 140 displays the driving take-over notice in S104. After that, in S105, the surroundings state ascertainment unit 110 determines whether or not the remaining distance from the vehicle A to the driving involvement point is shorter than the threshold distance L2A. When the surroundings state ascertainment unit 110 determines that the remaining distance is shorter than the threshold distance L2A, the presentation information adjustment unit 140 displays the driving take-over notification and limits the display of the second task content in S106.

After that, in S107, the surroundings state ascertainment unit 110 determines whether or not the remaining distance from the vehicle A to the driving involvement point is shorter than the threshold distance L3. When the surroundings state ascertainment unit 110 determines that the remaining distance is shorter than the threshold distance L3, the presentation information adjustment unit 140 displays the driving take-over warning and stops displaying the second task content in S108 and ends the series of processes.

On the other hand, when the surroundings state ascertainment unit 110 determines that the hands-off is prohibited after the driving take-over in S102, the process proceeds to S110. In S110, the surroundings state ascertainment unit 110 determines whether or not the remaining distance from the vehicle A to the driving involvement point is shorter than the threshold distance L1B. When the surroundings state ascertainment unit 110 determines that the remaining distance is shorter than the threshold distance L1B, the presentation information adjustment unit 140 displays the driving take-over notice in S111.

After that, in S112, the surroundings state ascertainment unit 110 determines whether or not the remaining distance from the vehicle A to the driving involvement point is shorter than the threshold distance Lon. When the surroundings state ascertainment unit 110 determines that the remaining distance is shorter than the threshold distance Lon, the presentation information adjustment unit 140 performs the hands-on notification in S113. Next, in S114, the surroundings state ascertainment unit 110 determines whether or not the remaining distance from the vehicle A to the driving involvement point is shorter than the threshold distance L2B.

When the surroundings state ascertainment unit 110 determines that the remaining distance is shorter than the threshold distance L2B, the presentation information adjustment unit 140 displays a driving take-over notification and limits the display of the second task content in S115. After that, in S116, the surroundings state ascertainment unit 110 determines whether or not the remaining distance from the vehicle A to the driving involvement point is shorter than the threshold distance L3s. When the surroundings state ascertainment unit 110 determines that the remaining distance is shorter than the threshold distance L3s, the presentation information adjustment unit 140 performs the hands-on notification and stops displaying the second task in S117.

Next, in S118, the surroundings state ascertainment unit 110 determines whether or not the remaining distance from the vehicle A to the driving involvement point is shorter than the threshold distance L3. When the surroundings state ascertainment unit 110 determines that the remaining distance is shorter than the threshold distance L3, the driving take-over warning is displayed in S119 and the series of processes is ended.

The above-described S101 and S102 are an example of a "determination process". S104, S106, S108, S111, S115, S117, and S119 are an example of a "presentation control process".

According to the above-described first embodiment, when the mode transitions from the monitoring interruption mode to the monitoring mode in which the release of hands is prohibited in the automated driving, the timing of presenting information related to the transition of the mode is earlier than in a case where the mode transitions to the monitoring-required mode in which the release of hands is permitted. Therefore, in the former case where an operation of gripping the steering wheel may be required, a time period for performing the gripping operation may be secured to be longer. As a result, a presentation control device, a presentation control method, and a presentation control program that can present highly convenient information may be provided.

Second Embodiment

A second embodiment describes a modification of the automated driving control system 1 according to the first embodiment. In the second embodiment, in a case where the level transitions from automated driving Level 3 to Level 2 of a hands-off prohibited state, an action planning unit 74 of a second automated driving ECU 70 sets the traveling speed of a vehicle A to be lower than in a case where the level transitions from automated driving Level 3 to Level 2 of a hands-off permitted state. The action planning unit 74 is an example of a "speed control unit".

An HCU 100 according to the second embodiment performs driving involvement notice, driving involvement notification, driving involvement warning, hands-on notification, limiting of display of a second task, and stop of the display of the second task according to a distance to a driving involvement point in a similar manner to the first embodiment. Regarding the presentation of each information item, the HCU 100 sets a threshold distance for starting presenting information to be equivalent regardless of whether the level transitions to Level 2 of the hands-off prohibited state or Level 2 of the hands-off permitted state.

As a result, in a case where the level transitions from automated driving Level 3 to Level 2 of the hands-off prohibited state, a time period from the execution of the driving involvement notice to the time when the vehicle reaches the driving involvement point is longer than in a case where the level transitions from automated driving Level 3 to Level 2 of the hands-off permitted state. The same applies to the driving involvement notification and the limiting of the display of the second task.

Figure 9:
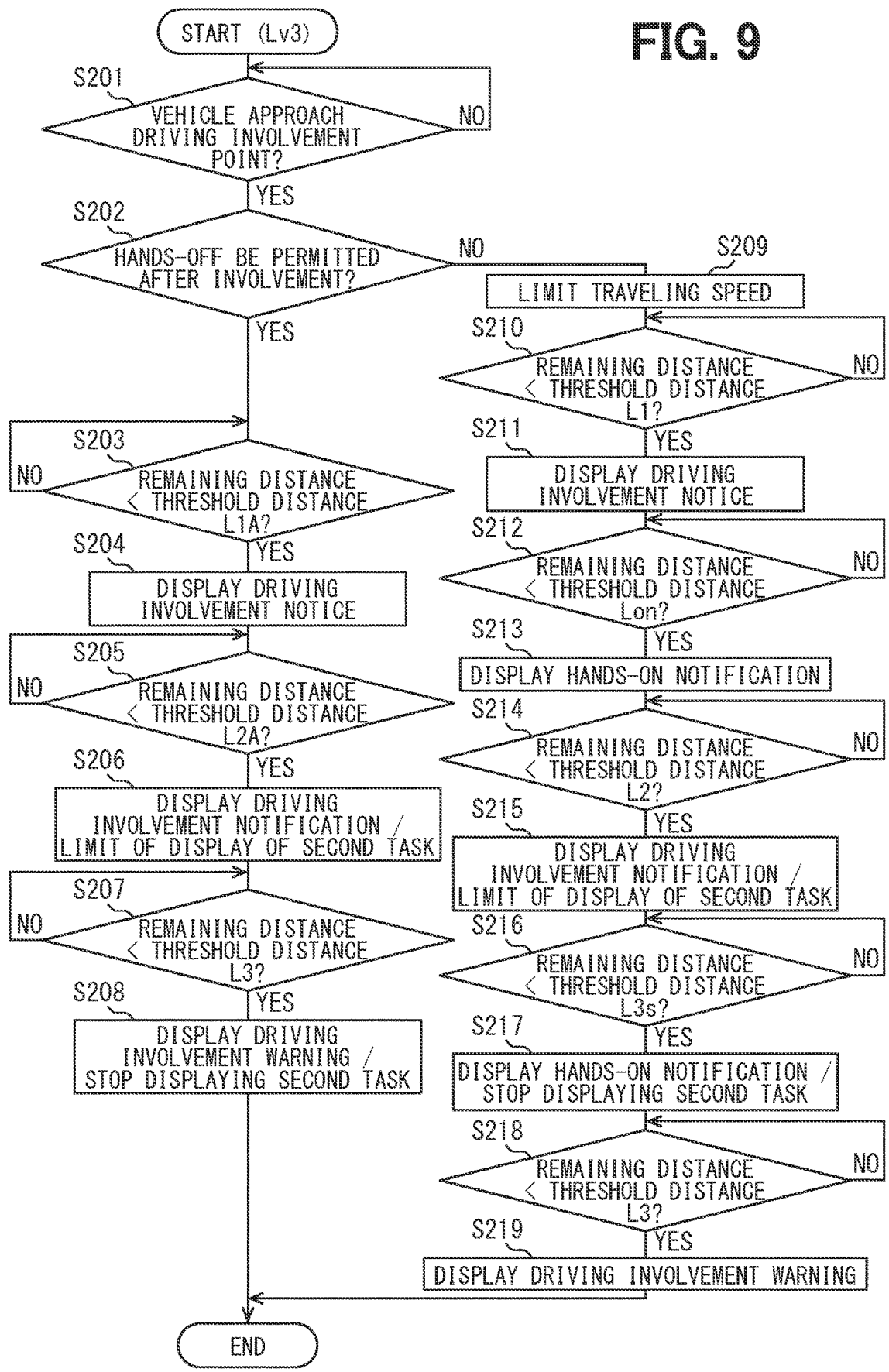
FIG. 9 is a flowchart illustrating an example of an automated driving control method performed by an automated driving control system in a second embodiment.

Next, the flow of an automated driving control method to be performed by an automated driving control system 1 in collaboration with functional blocks is described below with reference to FIG. 9. The automated driving control method illustrated in FIG. 9 is enabled by processors 12, 62, and 72 executing an automated driving control program stored in memories 11, 61, and 71 of the automated driving control system 1.

S201 to S208 are equivalent with the processes of S101 to S108. However, when a surroundings state ascertainment unit 110 determines that the hands-off is prohibited after the transition to Level 2 in S202, the process proceeds to S209. In S209, the action planning unit 74 of the second automated driving ECU 70 sets the traveling speed of the vehicle A to be lower than in a case where the hands-off is permitted after the transition to Level 2. Processes of S210 to S2109 after S209 are almost the same as the processes of S110 to S119. However, in S210, a threshold distance is L1 that is the same as that used in S203. In addition, in S214, a threshold distance is L2 that is the same as that used in S205. In S218, a threshold distance is L3 that is the same as that used in S207.

In the second embodiment, the above-described S201 and S202 are an example of the "determination process", S204, S206, S208, S211, S215, S217, and S219 are an example of the "presentation control process", and S209 is an example of a "speed control process".

Even in the above-described second embodiment, in a case where the mode transitions from a monitoring interruption mode to a monitoring mode in which the release of hands is prohibited, the timing of presenting information related to the transition of the mode is earlier than in a case where the mode transitions to a monitoring-required mode in which the release of hands is permitted. Therefore, in the former case where an operation of gripping a steering wheel may be required, a time period for performing the gripping operation may be secured to be longer. As a result, it is possible to present highly convenient information.

In the second embodiment, regarding the driving involvement notice, the driving involvement notification, and the limiting of the display of the second task, regardless of whether the level transitions to automated driving Level 2 of the hands-off prohibited state or automated driving Level 2 of the hands-off permitted state, the threshold distance for starting presenting information is set to be equivalent. Instead of this, regarding the presentation of each information item, as in the first embodiment, the threshold distance for the transition to the hands-off prohibited state may be set longer than the threshold distance for the transition to the hands-off permitted state. That is, the threshold distances can be set to an arbitrary value as long as the presentation of information can be started earlier in the hands-off prohibited state.

Third Embodiment

Figure 10:
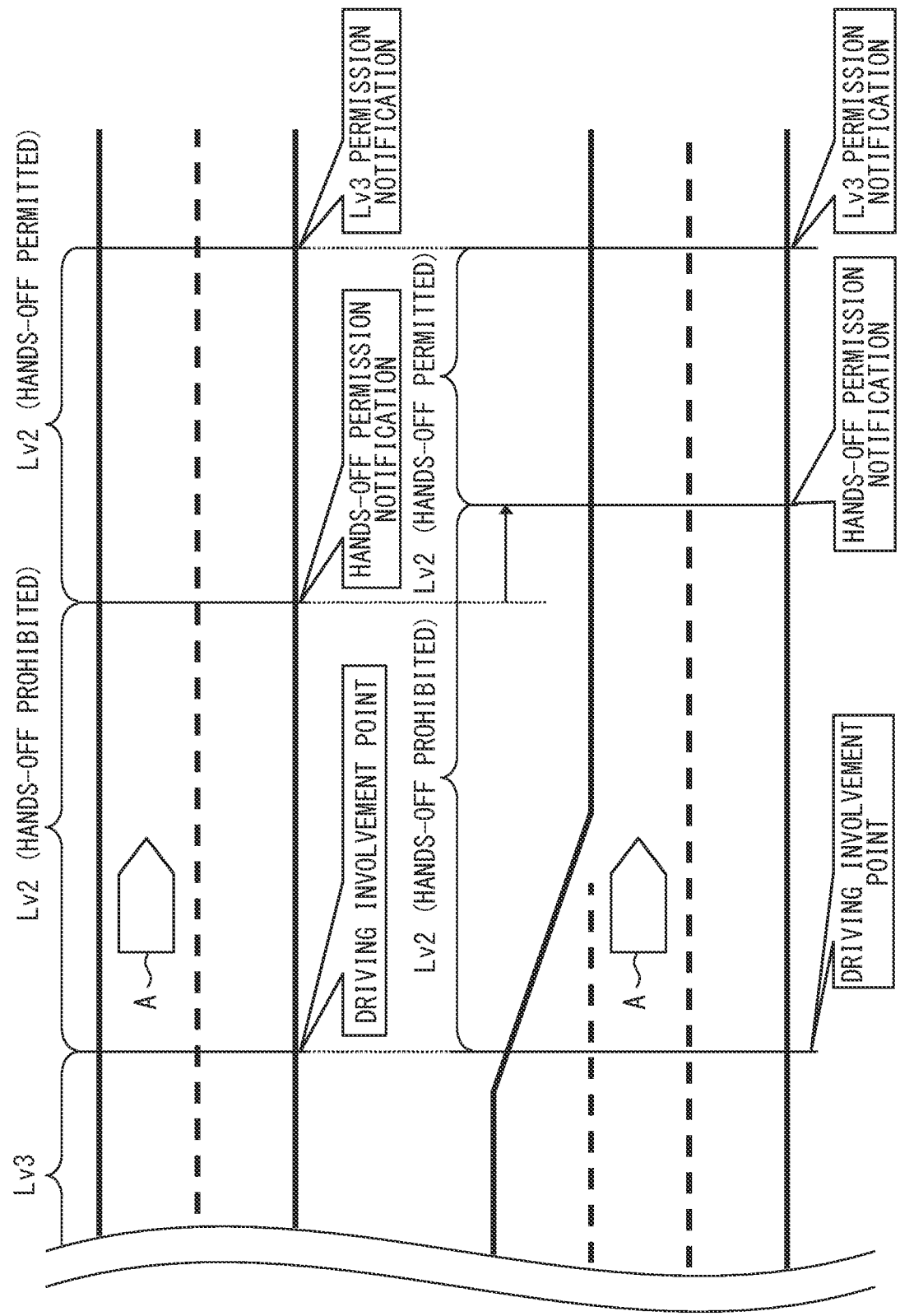
FIG. 10 is a diagram illustrating an example of a timing of presenting information in a third embodiment.
Figure 11:
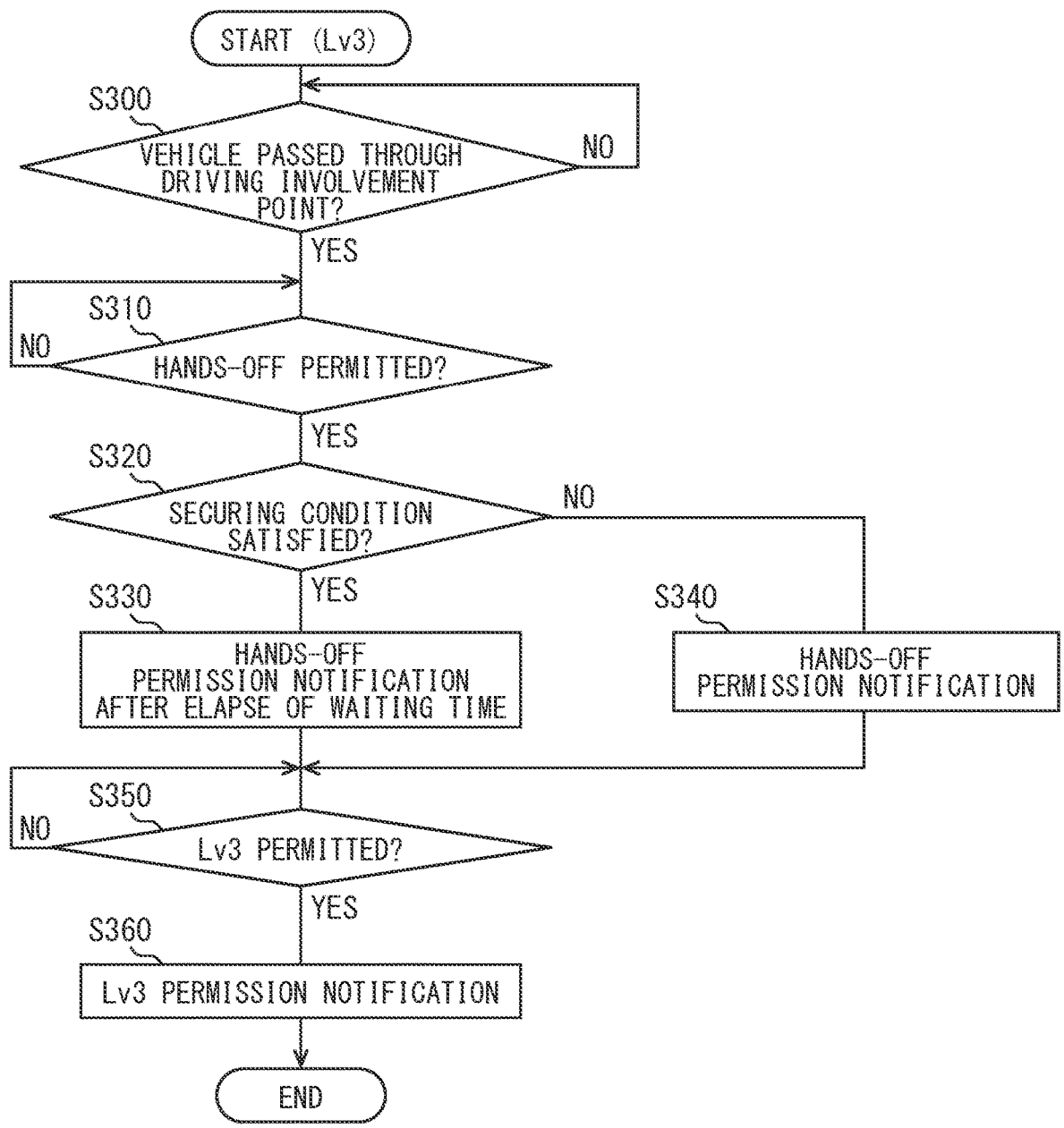
FIG. 11 is a flowchart illustrating an example of a presentation control method performed by an HCU in the third embodiment.

A third embodiment describes a modification of the automated driving control system 1 according to the first embodiment. In FIGS. 10 and 11, constituent elements denoted by the same reference signs as those in the drawings of the first embodiment are similar constituent elements and obtain the same effects.

In the third embodiment, an HCU 100 performs hands-off permission notification and Level 3 permission notification as information presentation that prompts a driver to start involvement in driving, in addition to the first embodiment.

The hands-off permission notification is a notification that notifies the driver that hands-off is permitted when the state transitions from a hands-off prohibited state to a hands-off permitted state in automated driving Level 2. The hands-off permission notification is performed by a presentation information adjustment unit 140 when a driving state determination unit 120 determines that the state can transition from the hands-off prohibited state to the hands-off permitted state in automated driving Level 2. The transition from the hands-off prohibited state to the hands-off permitted state in automated driving Level 2 is an example of "state transition". In addition, the presentation of the hands-off permission notification in the transition is an example of "state transition presentation".

The driving state determination unit 120 determines whether or not a securing condition is established in a case where the state transitions to the hands-off permitted state. The securing condition is a condition that is established when it is necessary to secure driving of the driver with hands released until the hands-off is permitted, that is, when an operation time for operating a steering wheel until the hands-off is permitted. The operation time can be a time period for preparing the driving with hands released. For example, whether or not the securing condition is established is determined according to the reason why involvement in the driving is required at a driving involvement point. The reason is, for example, that a road structure is a specific structure, a structure in which an obstacle or an emergency vehicle is to be avoided, or the like. Examples of the specific structure include, for example, a junction, a curve, a tunnel, and the like.

In a case where the securing condition is not established, the presentation information adjustment unit 140 starts presenting the hands-off permission notification immediately after the driving state determination unit 120 determines that the state can transition to the hands-off permitted state. In other words, after the driving state determination unit 120 determines that the state can transition to the hands-off permitted state, the presentation information adjustment unit 140 starts presenting the hands-off permission notification without setting a waiting time to be described later.

On the other hand, in a case where the securing condition is established, the presentation information adjustment unit 140 sets a time period from the time when a vehicle passes through the driving involvement point to the start of the presentation of the hands-off permission notification to be longer than in a case where the securing condition is not established (see FIG. 10). Specifically, in a case where the securing condition is established, the presentation information adjustment unit 140 sets the waiting time for waiting to present the hands-off permission notification after the driving state determination unit 120 determines that the state can transition to the hands-off permitted state. Instead of setting the waiting time, the presentation information adjustment unit 140 may set the distance from the driving involvement point where the presentation of the hands-off permission notification is started to be longer than in a case where the securing condition is not established. That is, in a case where the securing condition is established, the presentation information adjustment unit 140 may perform control to delay the timing of presenting the hands-off permission notification after the passage through the driving involvement point, compared with a case where the securing condition is not established.

The presentation information adjustment unit 140 displays a hands-off permission message in the hands-off permission notification. The hands-off permission message is a content including a message image, like the notification messages N2$h$ and N2$m$, for example. The message image may be, for example, "Hands-off is possible" or the like. In addition, the presentation information adjustment unit 140 may display an icon or the like indicating that the hands-off is possible in the hands-off permission notification.

The Level 3 permission notification is a notification that notifies the driver of a state in which Level 3 is possible when the driving state transitions to the state in which Level 3 is possible. The Level 3 permission notification is performed by the presentation information adjustment unit 140 when the driving state determination unit 120 determines that the level can transition to automated driving Level 3.

The presentation information adjustment unit 140 sets, to a fixed value, a time period from the time when the driving state determination unit 120 determines that the level can transition to automated driving Level 3 to the time when the level 3 permission notification is performed, regardless of whether or not the above-described securing condition is established. For example, the presentation information adjustment unit 140 may perform the Level 3 permission notification immediately after the driving state determination unit 120 determines that the level can transition to automated driving Level 3.

The presentation information adjustment unit 140 displays a Level 3 permission message in the Level 3 permission notification. The Level 3 permission message is a content including a message image similar to the notification messages N2$h$ and N2$m$, for example. The message image is, for example, "Automated driving Level 3 is possible." or the like. Alternatively, the presentation information adjustment unit 140 may display an icon or the like indicating that Level 3 is possible in the Level 3 permission notification.

Next, a presentation control method to be performed by the HCU 100 according to the third embodiment is described with reference to FIG. 11.

First, in S300, a surroundings state ascertainment unit 110 determines whether or not the vehicle A has passed through the driving involvement point. When the surroundings state ascertainment unit 110 determines that the vehicle A has passed through the driving involvement point, this flow proceeds to S310. In S310, the driving state determination unit 120 determines whether or not the hands-off can be permitted, that is, whether or not the vehicle is in the hands-off permitted state. In S310, the process is repeated until the vehicle is in the hands-off permitted state.

When the driving state determination unit 120 determines that the vehicle is in the hands-off permitted state, this flow proceeds to S320. In S320, the driving state determination unit 120 determines whether or not the securing condition is established. When the driving state determination unit 120 determines that the securing condition is established, the presentation information adjustment unit 140 presents the hands-off permission notification after the elapse of the waiting time in S330.

On the other hand, when the driving state determination unit 120 determines that the securing condition is not established, the presentation information adjustment unit 140 presents the hands-off permission notification immediately after the determination in S340.

When the hands-off permission notification is presented in S330 or S340, the driving state determination unit 120 determines whether or not automated driving Level 3 can be permitted in S350. The process of S350 is repeated until the driving state determination unit 120 determines that automated driving Level 3 can be permitted.

When the driving state determination unit 120 determines that automated driving Level 3 can be permitted, the presentation information adjustment unit 140 performs the level 3 permission notification in S360. When the process of S340 is performed, this flow ends. In the above description, S320 is an example of the "determination process", and S330, S340, and S360 are an example of the "presentation control process".

According to the above-described third embodiment, regarding the hands-off permission notification in a case where the securing condition is established, the timing of the presentation after the passage through the driving involvement point is later than in a case where the securing condition is not established. Therefore, when it is necessary to secure a time period for preparing the driving by the driver, a time period to the notification may be secured to be longer than in a case where it is not necessary. Therefore, the driver may be able to reliably secure the time period for the preparation.

Fourth Embodiment

Figure 12:
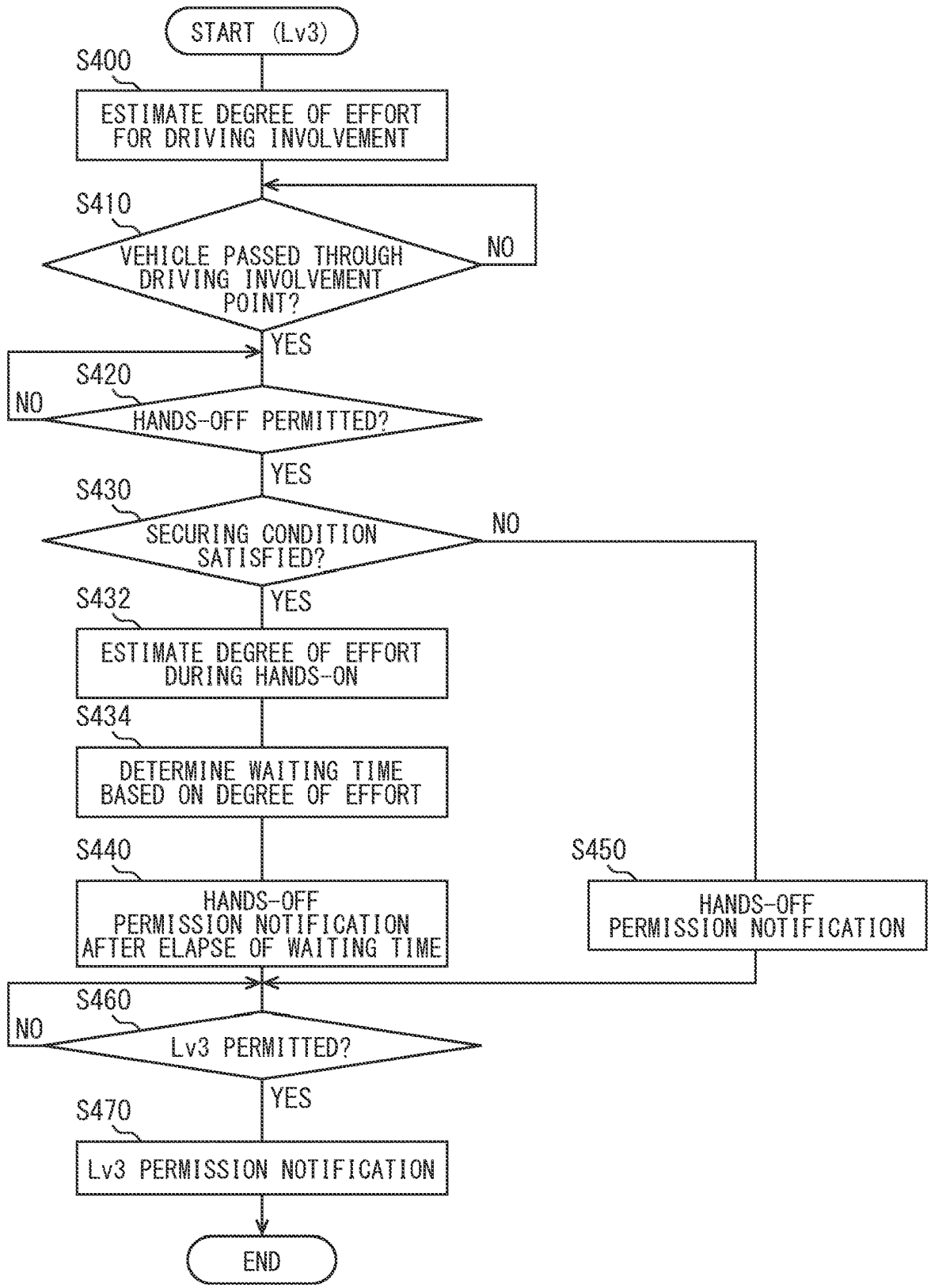
FIG. 12 is a flowchart illustrating an example of a presentation control method performed by an HCU in a fourth embodiment.

A fourth embodiment describes a modification of the automated driving control system 1 according to the first embodiment. In FIG. 12, constituent elements denoted by the same reference signs as those in the drawings of the first embodiment are similar constituent elements and obtain the same effects.

In the fourth embodiment, a driving state determination unit 120 estimates a degree of transition effort as a degree of effort for involvement in driving by a driver. The degree of transition effort is determined based on a timing of a change to a driving posture of the driver, a timing of starting surroundings monitoring, a timing of starting operating a steering wheel, and the like. The lower the degree of transition effort, the earlier driving can be prepared. The degree of transition effort is evaluated at a plurality of stages. The degree of transition effort is determined to be the lowest level when each of the above-described timings is before the presentation of a driving involvement warning. On the other hand, when at least one of the timings is after the presentation of the driving involvement warning, the degree of transition effort is a level according to the timing after the presentation.

In addition, the driving state determination unit 120 estimates a degree of operation effort as a degree of effort for a driving operation in a state in which the driver is in a hands-on state after the driver starts involvement in driving. For example, the degree of operation effort is determined based on a deviation by a steering operation, a deviation of the line of sight of the driver, and the like. The lower the degree of operation effort, the more the driving operation is stable. The degree of operation effort is evaluated at a plurality of stages. When the magnitude of each of the deviations is equal to or smaller than a threshold, the degree of operation effort is determined to be the minimum level. When the magnitude is larger than the threshold, the degree of operation effort is determined to be a level according to the magnitude.

Similarly to the third embodiment, a presentation information adjustment unit 140 presents a hands-off permission notification and a Level 3 permission notification. Similarly to the third embodiment, regarding the hands-off permission notification in a case where a securing condition is established, the present information adjustment unit 140 sets the timing of the presentation after passage through a driving involvement point to be later than in a case where the securing condition is not established. That is, regarding the hands-off permission notification in a case where the securing condition is established, the presentation information adjustment unit 140 sets a waiting time from the time when it is determined that hands-off can be permitted.

However, the presentation information adjustment unit 140 adjusts the waiting time according to each degree of effort. Specifically, the presentation information adjustment unit 140 sets the waiting time such that the higher each degree of effort, the longer the waiting time. When each degree of effort is the minimum level, the presentation information adjustment unit 140 sets the waiting time to be zero. That is, when all the degrees of effort are the minimum level, the presentation information adjustment unit 140 sets the timing of presenting the hands-off permission notification to be equivalent with that when the securing condition is not established.

Next, a presentation control method to be performed by an HCU 100 according to the fourth embodiment is described with reference to FIG. 12.

First, in S400, the driving state determination unit 120 estimates the degree of transition effort. The subsequent S410, S420, and S430 are the same as or similar to the processes of S300, S310, and S320 illustrated in FIG. 11.

When it is determined that the securing condition is established in S430, this flow proceeds to S432. In S432, the driving state determination unit 120 estimates the degree of operation effort. Next, in S434, the presentation information adjustment unit 140 sets, based on the degree of transition effort and the degree of operation effort, a waiting time after it is determined that the hands-off can be permitted. In the subsequent S440, the presentation information adjustment unit 140 presents the hands-off permission notification after the elapse of the set waiting time.

On the other hand, when it is determined that the securing condition is not established in S430, this flow proceeds to S450. S450 is the same as or similar to the process of S340 illustrated in FIG. 11. In addition, processes of S460 and S470 subsequent to S440 or S450 are the same as or similar to the processes of S350 and S360. In the above description, S400, S430, and S432 are an example of the "determination process". In addition, S440, S450, and S470 are an example of the "presentation control process".

According to the above-described fourth embodiment, regarding the hands-off permission notification in a case where the securing condition is established, the timing of the presentation after the passage through the driving involvement point is set later as the degree of transition effort is higher. Therefore, as a period of time for the driver to take to get involved in driving is longer, it may be possible to secure a longer time to the start of the subsequent hands-off. Therefore, a preparation time according to the degree of effort of the driver may be reliably secured.

In addition, according to the fourth embodiment, regarding the hands-off permission notification in a case where the securing condition is established, the timing of the presentation after the passage through the driving involvement point is set later as the degree of operation effort is higher. Therefore, as a period of time for the driver to take to perform the driving operation is longer, it may be possible to secure a longer time to the start of the subsequent hands-off. Therefore, a preparation time according to the degree of effort of the driver may be reliably secured.

Fifth Embodiment

Figure 13:
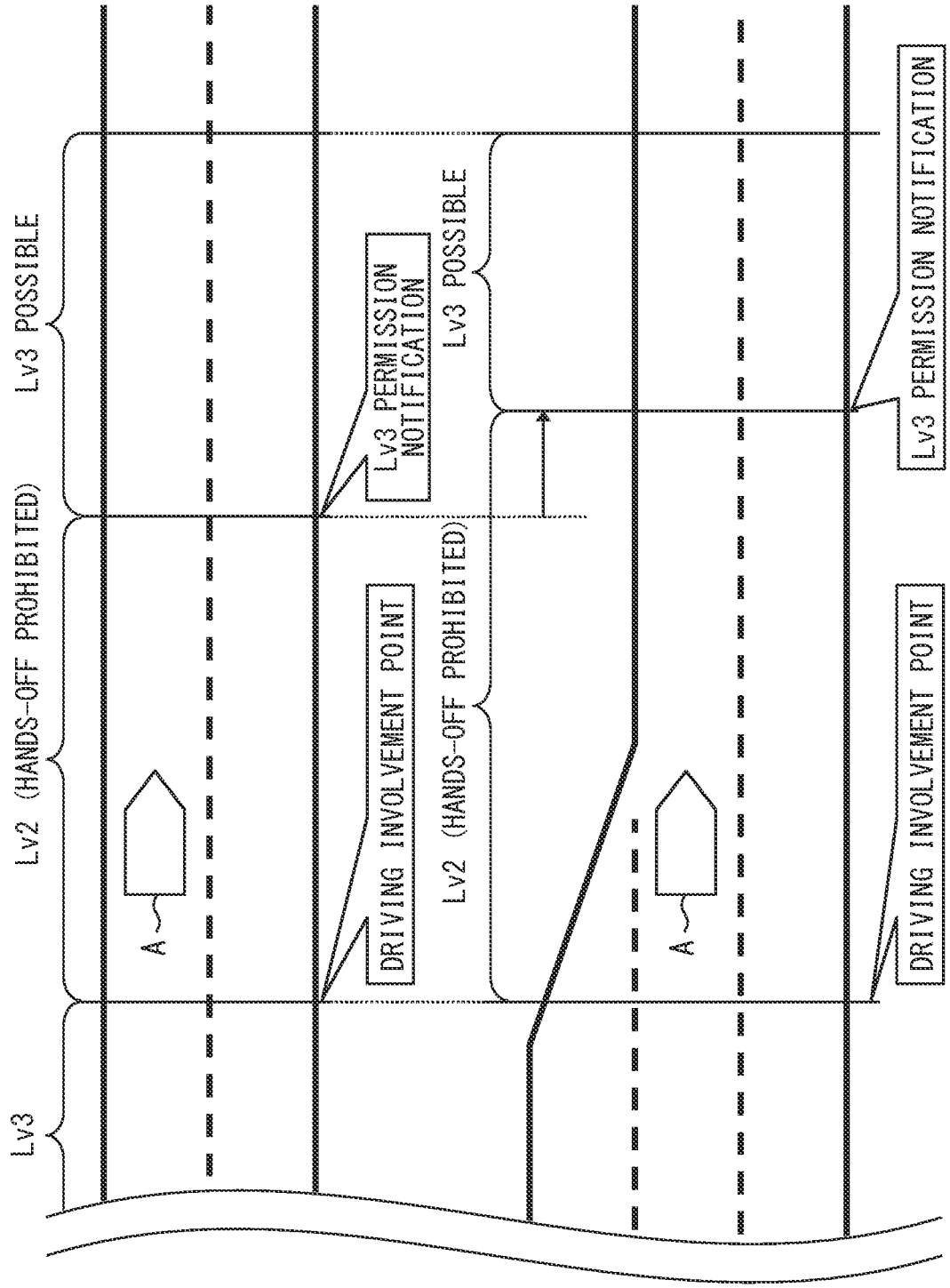
FIG. 13 is a diagram illustrating an example of a timing of presenting information in a fifth embodiment.
Figure 14:
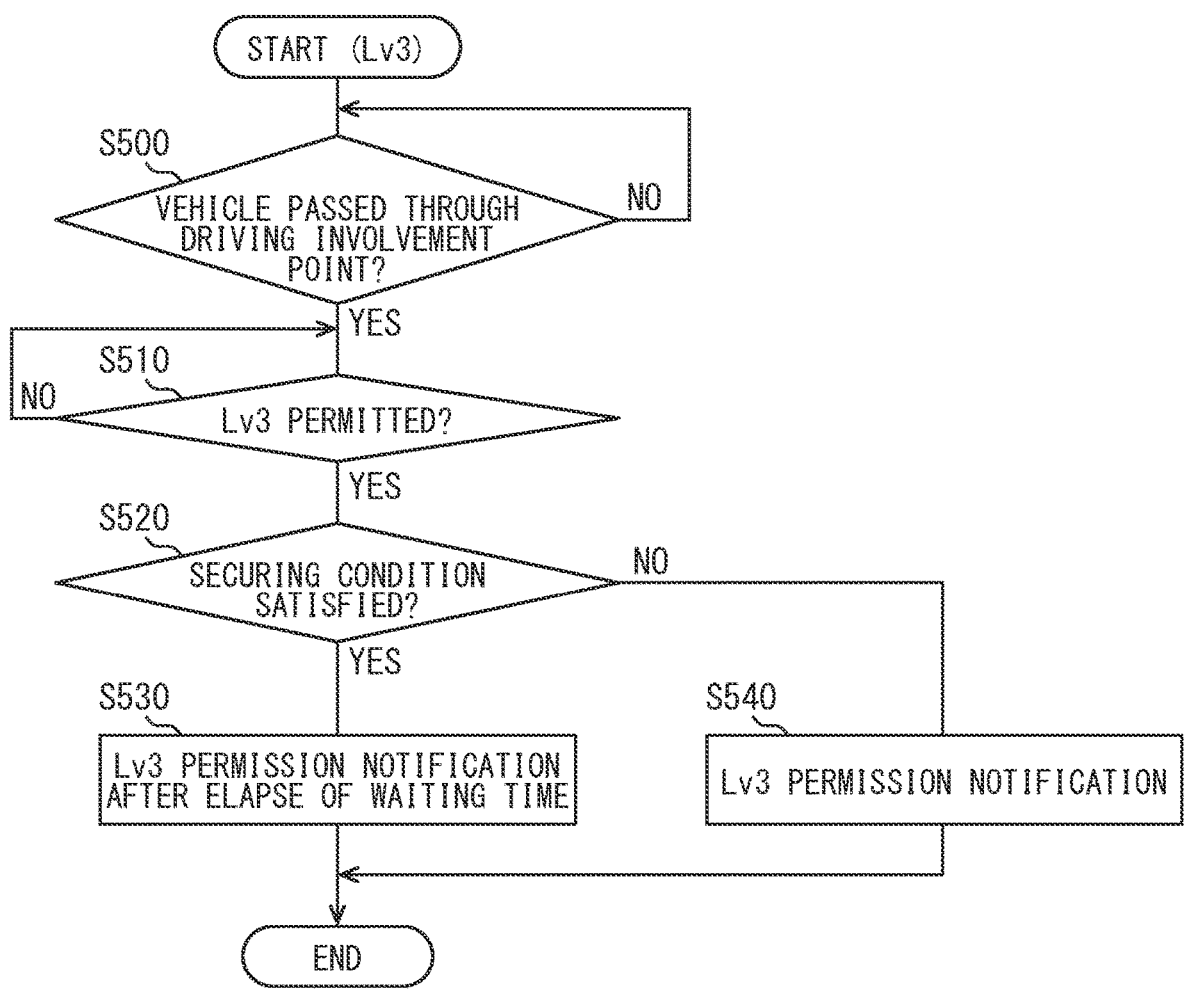
FIG. 14 is a flowchart illustrating an example of a presentation control method performed by an HCU in the fifth embodiment.

A fifth embodiment describes a modification of the automated driving control system 1 according to the first embodiment. In FIGS. 13 and 14, constituent elements denoted by the same reference sings as those in the drawings of the first embodiment are similar constituent elements and obtain the same effects.

In the fifth embodiment, a driving state determination unit 120 determines whether or not a securing condition is established in a case where the state transitions from a hands-off prohibited state to a Level 3 permitted state without transitioning through a hands-off permitted state.

When the state transitions from the hands-off prohibited state of automated driving Level 2 to the Level 3 permitted state without transitioning through the hands-off permitted state, a presentation information adjustment unit 140 changes the timing of the presentation after the passage through a driving involvement point according to whether or not the securing condition is established. Specifically, in a case where the securing condition is established, the presentation information adjustment unit 140 sets the timing to be later than in a case where the securing condition is not established (see FIG. 13).

Similarly to the hands-off permission notification according to the third embodiment, regarding Level 3 permission notification in a case where the securing condition is established, the presentation information adjustment unit 140 may set a waiting time from the time when it is determined that Level 3 can be permitted. Alternatively, instead of setting the waiting time, the presentation information adjustment unit 140 may set a distance from the driving involvement point where the presentation of the Level 3 permission notification is started such that the distance is longer than in a case where the securing condition is not established. That is, in a case where the securing condition is established, the presentation information adjustment unit 140 may control the timing of presenting the Level 3 permission notification after the passage through the driving involvement point such that the timing is later than in a case where the securing condition is not established. The presentation of the Level 3 permission notification in the transition from automated driving Level 2 of the hands-off prohibited state to the Level 3 permitted state is an example of the "interruption mode presentation".

In addition, in a case where the securing condition is not established, the presentation information adjustment unit 140 may perform the Level 3 permission notification immediately after it is determined that the transition to automated driving Level 3 is possible.

Next, a presentation control method to be performed by an HCU 100 according to the fifth embodiment is described with reference to FIG. 14.

First, in S500, a surroundings state ascertainment unit 110 determines whether or not a vehicle A has passed through the driving involvement point. When the surroundings state ascertainment unit 110 determines that the vehicle A has passed through the driving involvement point, this flow proceeds to S510. In S510, the driving state determination unit 120 determines whether or not automated driving Level 3 can be permitted, that is, whether or not the state is the Level 3 permitted state. In S510, the process is repeated until the driving state determination unit 120 determines that the state is the Level 3 permitted state.

When the driving state determination unit 120 determines that the state is the Level 3 permitted state, this flow proceeds to S520. In S520, the driving state determination unit 120 determines whether or not the securing condition is established. When the driving state determination unit 120 determines that the securing condition is established, the presentation information adjustment unit 140 presents the Level 3 permission notification after the elapse of the waiting time in S530.

On the other hand, when the driving state determination unit 120 determines that the securing condition is not established in S520, the presentation information adjustment unit 140 presents the Level 3 permission notification immediately after the determination in S540.

In the above description, S520 is an example of the "determination process", and S530 and S540 are an example of the "presentation control process".

According to the above-described fifth embodiment, regarding the Level 3 permission notification in a case where the securing condition is established, the timing of the presentation after the passage through the driving involvement point is later than in a case where the securing condition is not established. Therefore, in a case where it is necessary to secure a time period for the driver to prepare driving, a time period to the notification may be secured to be longer than in a case where it is not necessary.

Other Embodiments

The disclosure in the present specification is not limited to the exemplified embodiments. The disclosure includes the exemplified embodiments and modifications by persons skilled in the art. For example, the disclosure is not limited to combinations of the parts and/or elements described in the embodiments. The disclosure can be implemented by various combinations. The disclosure may include an additional part that can be added to the embodiments. The disclosure includes a configuration from which a part and/or an element described in the embodiments are/is omitted. The disclosure includes replacement of a part and/or an element between one embodiment and another embodiment or a combination. The technical scope disclosed herein is not limited to the description of the embodiments. Some of the technical scopes disclosed herein are described in the claims and should be interpreted to include the description of the claims and all changes within meanings and scopes equivalent with the description of the claims.

In the above-described third embodiment, when the securing condition is established, the presentation information adjustment unit 140 sets the timing of presenting the hands-off permission notification after the passage through the driving involvement point to be later than in a case where the securing condition is not established. Instead of this, in a case where the securing condition is established, the action planning unit 140 may perform control to set the timing of presenting the hands-off permission notification after the passage through the driving involvement point to be later than in a case where the securing condition is not limited. Specifically, in a case where the securing condition is established, the action planning unit 74 may set the traveling speed of the vehicle A to be lower than in a case where the securing condition is not established.

In the above-described fourth embodiment, the presentation information adjustment unit 140 adjusts the waiting time according to each degree of effort, thereby adjusting the timing of presenting the hands-off permission notification. Instead of this, the action planning unit 74 may adjust the traveling speed of the vehicle A according to each degree of effort, thereby adjusting the timing of presenting the hands-off permission notification.

In the above-described fifth embodiment, in a case where the securing condition is established, the presentation information adjusting unknit 140 sets the timing of presenting the Level 3 permission notification after the passage through the driving involvement point to be later than in a case where the securing condition is not established. Instead of this, the action planning unit 74 may perform control to set the timing of presenting the level 3 permission notification after the passage through the driving involvement point to be later than in a case where the securing condition is not established. Specifically, in a case where the securing condition is established, the action planning unit 74 may set the traveling speed of the vehicle A to be lower than in a case where the securing condition is not established.

The HCU 100 may be a dedicated computer that includes at least one of a digital circuit and an analog circuit as a processor. In this case, particularly, the digital circuit is, for example, at least one type of an application specific integrated circuit (ASIC), a field programmable gate array (FPGA), a system on a chip (SOC), a programmable gate array (PGA), a complex programmable logic device (CPLD), and the like. In addition, the digital circuit may include a memory storing a program.

The HCU 100 may be provided by a pair of computer resources linked by a single computer or a data communication device. For example, some of the functions of the HCU 100 according to each of the above-described embodiments may be implemented by another ECU.

What is claimed is:

1. A presentation control device configured to control information presentation to a driver of a vehicle capable of performing automated driving, the presentation control device comprising:
   at least one processor; and
   a memory connected to the at least one processor and storing instructions that, when executed by the at least one processor, configure the at least one processor to provide:
   a determination unit configured to distinguish between a monitoring interruption mode in which the driver is permitted to interrupt surroundings monitoring and a monitoring-required mode in which the driver is prohibited to interrupt the surroundings monitoring, and in the monitoring-required mode, between a hands-free permitted state in which the driver is permitted to release hands from a steering wheel and a hands-free prohibited state in which the driver is prohibited to release the hands from the steering wheel;

a presentation control unit configured to perform the information presentation related to a mode transition from the monitoring interruption mode to the monitoring-required mode when the mode transition occurs, wherein the presentation control unit is configured to perform the information presentation at an earlier timing when the monitoring interruption mode is transitioned to the hands-free prohibited state of the monitoring-required mode than when the monitoring interruption mode is transitioned to the hands-free permitted state of the monitoring-required mode.

2. The presentation control device according to claim 1, wherein the presentation control unit is configured to, in the information presentation, perform a driving involvement notification that encourages the driver to start a driver action containing at least the surroundings monitoring.

3. The presentation control device according to claim 2, wherein the presentation control unit is configured to in the information presentation and after the driving involvement notification, perform a driving involvement warning that encourages the driver to start the driver action in a format different from the driving involvement notification, and perform the driving involvement warning at a same timing when the monitoring interruption mode is transitioned to the hands-free prohibited state of the monitoring-required mode and when the monitoring interruption mode is transitioned to the hands-free permitted state of the monitoring-required mode.

4. The presentation control device according to claim 3, wherein the presentation control unit is configured to in the information presentation, perform a limited presentation that limits a presentation of a content provided for a specific action other than a driving, and perform the limited presentation prior to the driving involvement warning when the monitoring interruption mode is transitioned to the hands-free permitted state of the monitoring-required mode.

5. The presentation control device according to claim 1, wherein the presentation control unit is configured to, in the information presentation, perform a limited presentation that limits a presentation of a content provided for a specific action other than a driving.

6. The presentation control device according to claim 1, wherein the determination unit is configured to determine whether a securing condition is satisfied, the securing condition being satisfied when it is necessary to secure an operation time for operating the steering wheel before the hands-free prohibited state is transmitted to the hands-free permitted state, and the presentation control unit is configured to when a state transition from the hands-free prohibited state to the hands-free prohibited state occurs, perform a state transition presentation that is the information presentation related to the state transition, and perform the state transition presentation at a later timing when the securing condition is satisfied than when the securing condition is not satisfied.

7. The presentation control device according to claim 6, wherein the presentation control unit is configured to when an interruption mode transition in which the hands-free permitted state of the monitoring-required mode is transitioned to the monitoring interruption mode occurs, perform an interruption mode presentation that is the information presentation related to the interruption mode transition, and perform the interruption mode presentation at a same timing when the securing condition is satisfied and when the securing condition is not satisfied.

8. The presentation control device according to claim 6, wherein the determination unit is configured to estimate a transition effort degree that is an effort degree related to a start of a driver action for a transition from the monitoring interruption mode to the hands-free prohibited state of the monitoring-required mode, and the presentation control unit is configured to perform the state transition presentation at a later timing as the transition effort degree is higher.

9. The presentation control device according to claim 6, wherein the determination unit is configured to estimate an action effort degree that is an effort degree related to a driver action in the hands-free prohibited state of the monitoring-required mode, and the presentation control unit is configured to perform the state transition presentation at a later timing as the action effort degree is higher.

10. The presentation control device according to claim 1, wherein the determination unit is configured to determine whether a securing condition is satisfied, the securing condition being satisfied when it is necessary to secure an operation time for operating the steering wheel before the hands-free prohibited state is transmitted to the monitoring interruption mode, and the presentation control unit is configured to when a state transition from the hands-free prohibited state to the monitoring interruption mode occurs, perform a state transition presentation that is the information presentation related to the state transition, and perform the state transition presentation at a later timing when the securing condition is satisfied than when the securing condition is not satisfied.

11. An automated driving control system configured to control automated driving of a vehicle, the automated driving control system comprising:

at least one processor; and a memory connected to the at least one processor and storing instructions that, when executed by the at least one processor, configure the at least one processor to provide:

a determination unit configured to distinguish between a monitoring interruption mode in which the driver is permitted to interrupt surroundings monitoring and a monitoring-required mode in which the driver is prohibited to interrupt the surroundings monitoring, and in the monitoring-required mode, between a hands-free permitted state in which the driver is permitted to release hands from a steering wheel and a hands-free prohibited state in which the driver is prohibited to release the hands from the steering wheel;

a presentation control unit configured to perform the information presentation related to a mode transition from the monitoring interruption mode to the monitoring-required mode when the mode transition occurs; and a speed control unit configured to control a traveling speed of the vehicle to be lower when the monitoring interruption mode is transitioned to the hands-free prohibited state of the monitoring-required mode than when the monitoring interruption mode is transitioned to the hands-free permitted state of the monitoring-required mode.

12. A presentation control device configured to control information presentation to a driver of a vehicle capable of performing automated driving, the presentation control device comprising:

at least one processor; and a memory connected to the at least one processor and storing instructions that, when executed by the at least one processor, configure the at least one processor to provide:

a determination unit configured to distinguish between a monitoring-required mode in which the driver is prohibited to interrupt surroundings monitoring during the automated driving, and in the monitoring-required mode, between a hands-free permitted state in which the driver is permitted to release hands from a steering wheel and a hands-free prohibited state in which the driver is prohibited to release the hands from the steering wheel;

a presentation control unit configured to perform the information presentation related to a state transition in the monitoring-required mode when the state transition occurs;

wherein the determination unit is further configured to determine whether a securing condition is satisfied, the securing condition being satisfied when it is necessary to secure an operation time for operating the steering wheel as a preparation time for driving in the hands-free permitted state before the hands-free prohibited state is transitioned to the hands-free permitted state; and the presentation control unit is configured to perform a state transition presentation that is the information presentation related to the state transition when the state transition from the hands-free prohibited state to the hands-free permitted state occurs, and to perform the state transition presentation at a later timing when the securing condition is satisfied than when the securing condition is not satisfied.

13. A presentation control device configured to control information presentation to a driver of a vehicle capable of performing automated driving, the presentation control device comprising:

at least one processor; and a memory connected to the at least one processor and storing instructions that, when executed by the at least one processor, configure the at least one processor to provide:

a determination unit configured to distinguish between a monitoring interruption mode in which the driver is permitted to interrupt surroundings monitoring during the automated driving, a monitoring-required mode in which the driver is prohibited to interrupt the surroundings monitoring, and in the monitoring-required mode, between a hands-free permitted state in which the driver is permitted to release hands from a steering wheel and a hands-free prohibited state in which the driver is prohibited to release the hands from the steering wheel;

a presentation control unit configured to perform the information presentation related to a mode transition from the monitoring interruption mode to the monitoring-required mode when the mode transition occurs;

wherein the determination unit is further configured to determine whether a securing condition is satisfied, the securing condition being satisfied when it is necessary to secure an operation time for operating the steering wheel as a preparation time for driving in the hands-free permitted state before the hands-free prohibited state is transitioned to the monitoring interruption mode; and the presentation control unit is configured to perform a state transition presentation that is the information presentation related to the state transition when the state transition from the hands-free prohibited state to the monitoring interruption mode occurs, and to perform the state transition presentation at a later timing when the securing condition is satisfied than when the securing condition is not satisfied.

\* \* \* \* \*